United States Patent
Asano et al.

(10) Patent No.: US 12,199,470 B2
(45) Date of Patent: Jan. 14, 2025

(54) ROTARY ELECTRIC MACHINE, COMPRESSOR, REFRIGERATION DEVICE, AND VEHICLE

(71) Applicants: DAIKIN INDUSTRIES, LTD., Osaka (JP); NAGOYA INSTITUTE OF TECHNOLOGY, Nagoya (JP)

(72) Inventors: Yoshinari Asano, Osaka (JP); Yoshihito Sanga, Osaka (JP); Takashi Kosaka, Nagoya (JP); Hiroaki Matsumori, Nagoya (JP)

(73) Assignees: DAIKIN INDUSTRIES, LTD., Osaka (JP); NAGOYA INSTITUTE OF TECHNOLOGY, Aichi (JP)

( * ) Notice: Subject to any disclaimer, the term of this patent is extended or adjusted under 35 U.S.C. 154(b) by 85 days.

(21) Appl. No.: 17/956,019

(22) Filed: Sep. 29, 2022

(65) Prior Publication Data

US 2023/0028189 A1 Jan. 26, 2023

Related U.S. Application Data

(63) Continuation of application No. PCT/JP2021/013674, filed on Mar. 30, 2021.

(30) Foreign Application Priority Data

Oct. 9, 2020 (JP) .................. 2020-171180

(51) Int. Cl.
*H02K 1/16* (2006.01)
*H02K 1/17* (2006.01)
*H02K 19/12* (2006.01)

(52) U.S. Cl.
CPC .............. *H02K 1/165* (2013.01); *H02K 1/17* (2013.01); *H02K 19/12* (2013.01)

(58) Field of Classification Search
CPC .......... H02K 1/165; H02K 1/17; H02K 19/12; H02K 21/04; H02K 21/44; H02K 2213/09
See application file for complete search history.

(56) References Cited

U.S. PATENT DOCUMENTS

2019/0058381 A1* 2/2019 Asano ................... H02K 3/48

FOREIGN PATENT DOCUMENTS

| CN | 101552494 A | 10/2009 |
|----|-------------|---------|
| CN | 104578659 A | 4/2015 |

(Continued)

OTHER PUBLICATIONS

JP-2019176602-A, Asano et al., all pages (Year: 2019).*

(Continued)

*Primary Examiner* — Naishadh N Desai
(74) *Attorney, Agent, or Firm* — Global IP Counselors, LLP

(57) ABSTRACT

A rotary electric machine includes a rotor, and a stator facing the rotor with a predetermined gap interposed between the rotor and stator. The stator has a stator core formed in a substantially circular annular shape and provided with an armature slot and a field slot alternately arranged in a circumferential direction, an armature winding housed in the armature slot, and a field winding and a first field magnet housed in the field slot. The armature winding generates a rotating magnetic field to rotate the rotor by being supplied with an alternating current armature current. The field winding generates a field flux by being supplied with a direct current field current. The first field magnet changes a magnetic force by the field flux.

16 Claims, 26 Drawing Sheets

(56) References Cited

FOREIGN PATENT DOCUMENTS

| CN | 108880163 A | | 11/2018 |
|---|---|---|---|
| JP | 2016127610 A | * | 7/2016 |
| JP | 2018174645 A | * | 11/2018 |
| JP | 2019176602 A | * | 10/2019 |
| WO | 2018/061701 A1 | | 9/2017 |

OTHER PUBLICATIONS

JP-2018174645-A, Asano et al., all pages (Year: 2018).*
JP-2016127610-A, Asano et al., all pages (Year: 2016).*
European Search Report of corresponding EP Application No. 21 78 0026.7 dated Jan. 29, 2024.
International Preliminary Report of corresponding PCT Application No. PCT/JP2021/013674 dated Oct. 13, 2022.
International Search Report of corresponding PCT Application No. PCT/JP2021/013674 dated Jun. 15, 2021.

* cited by examiner

FIG.1
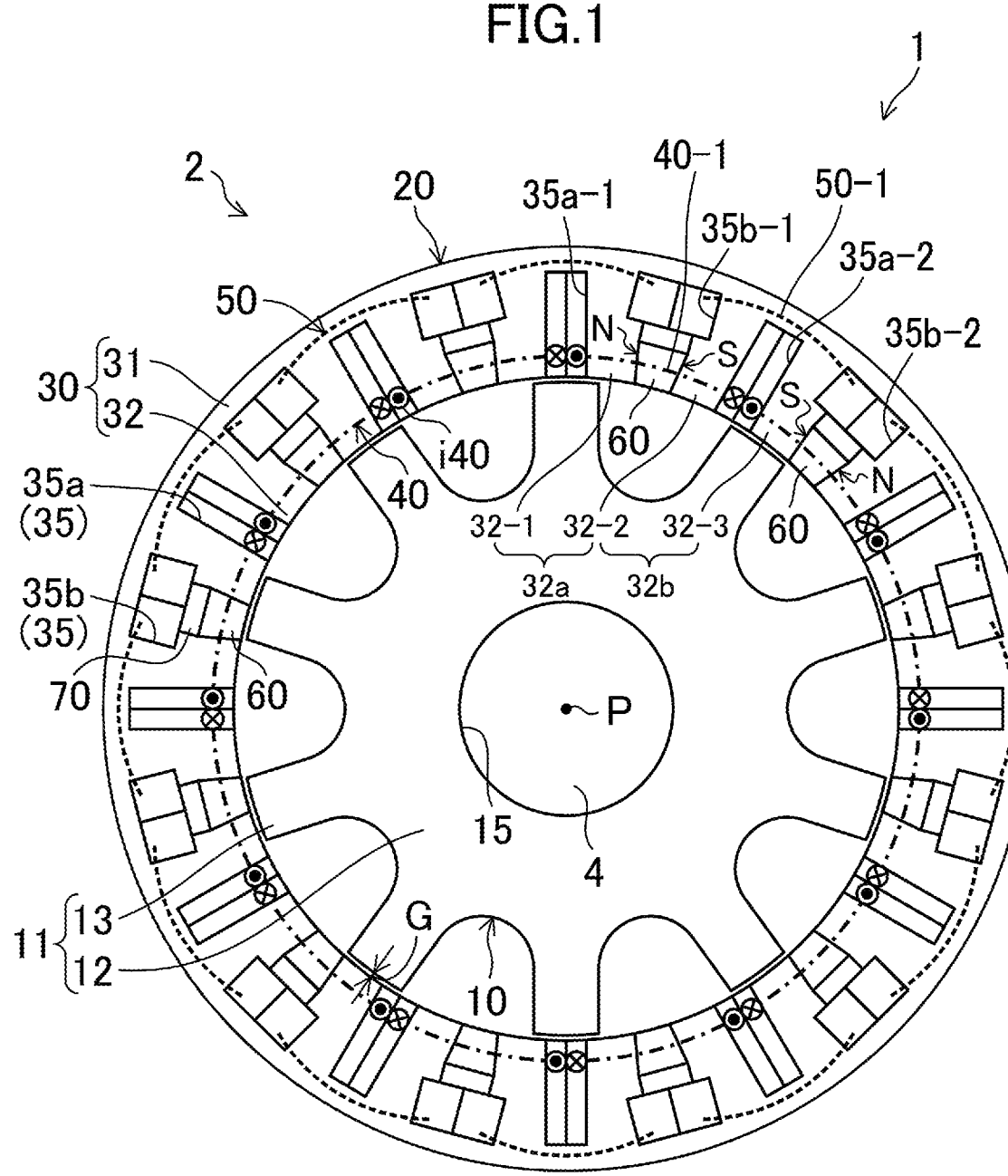
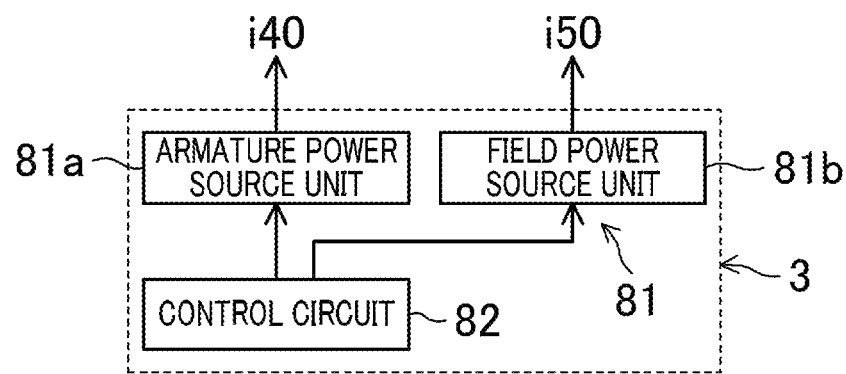

FIG.11
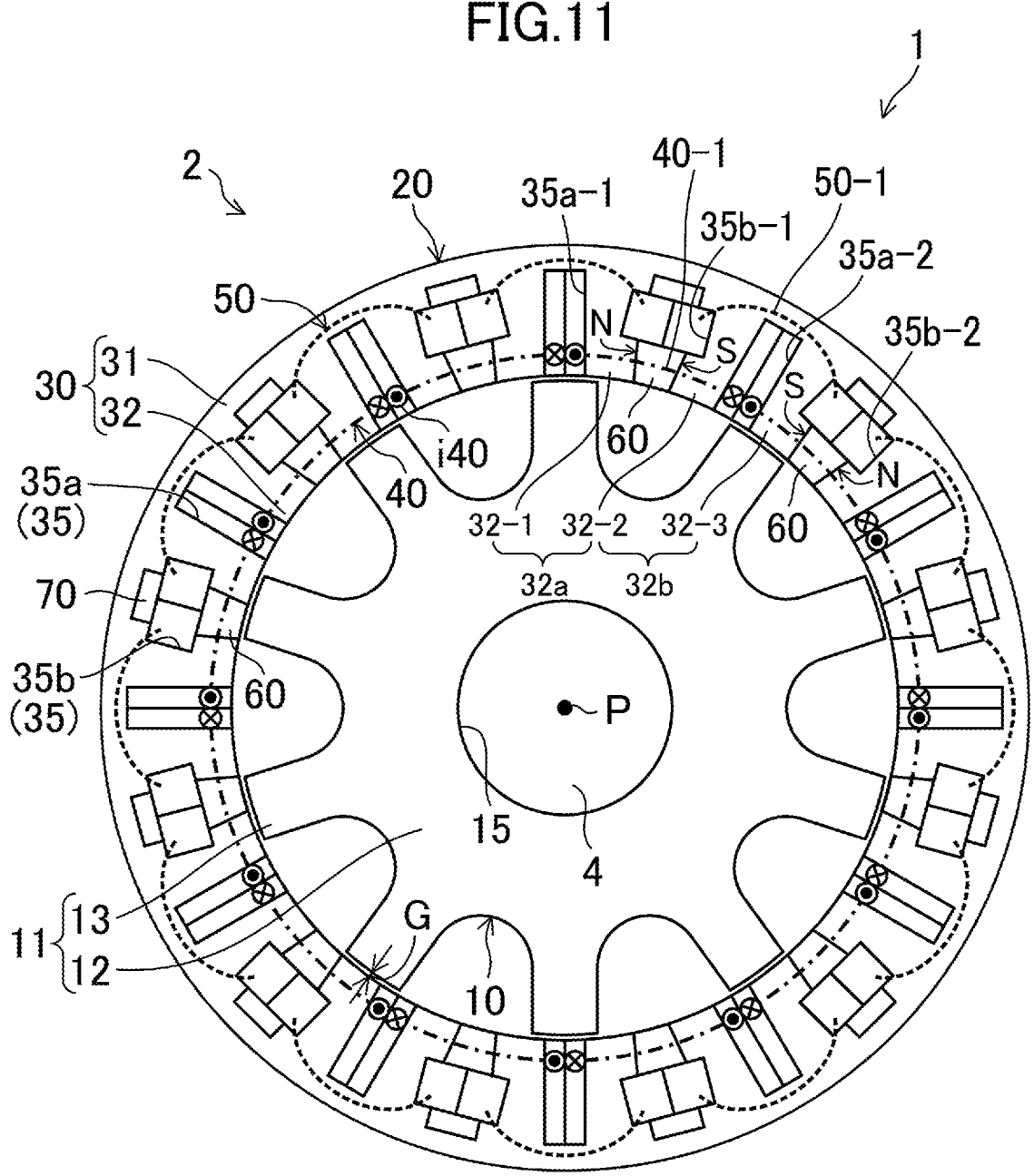
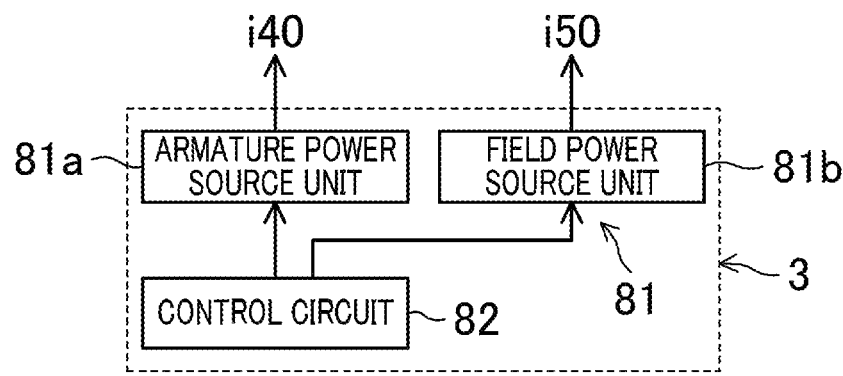

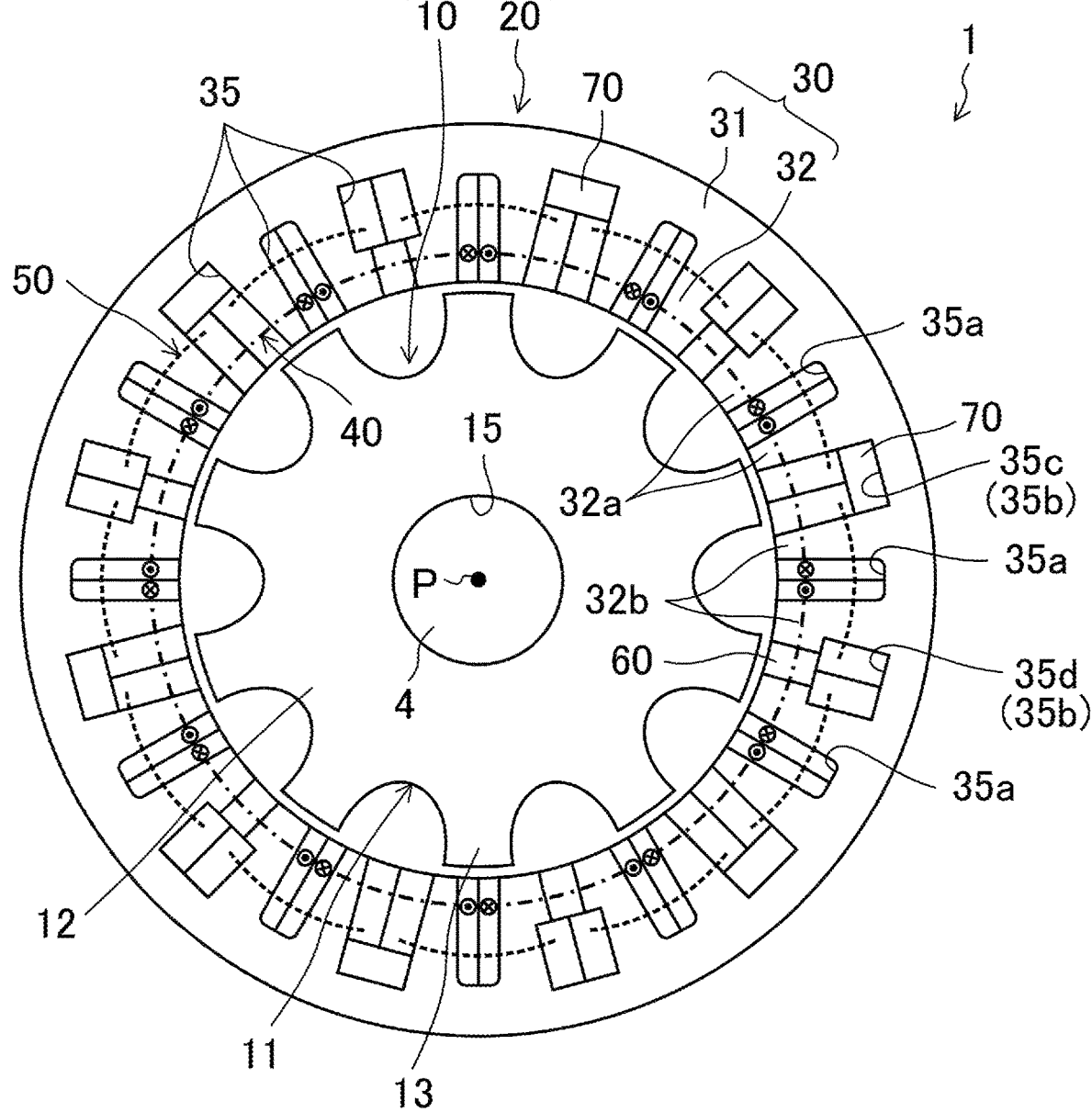
FIG.23
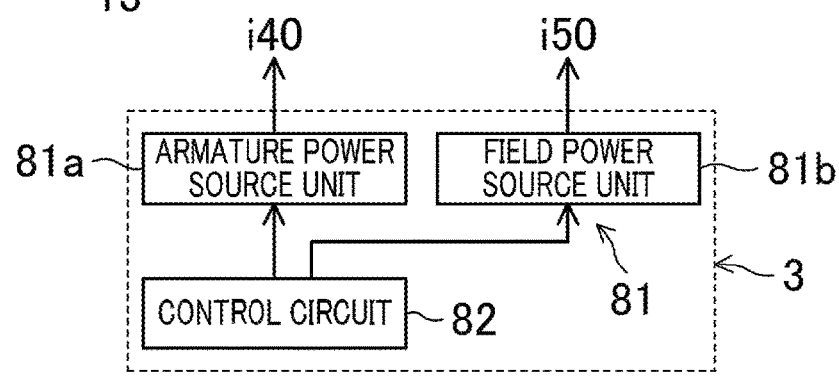

ROTARY ELECTRIC MACHINE, COMPRESSOR, REFRIGERATION DEVICE, AND VEHICLE

CROSS-REFERENCE TO RELATED APPLICATIONS

This is a continuation of International Application No. PCT/JP2021/013674 filed on Mar. 30, 2021, which claims priority to Japanese Patent Application No. 2020-063456, filed on Mar. 31, 2020 and Japanese Patent Application No. 2020-171180, filed on Oct. 9, 2020. The entire disclosures of these applications are incorporated by reference herein.

BACKGROUND

Technical Field

The present disclosure relates to a rotary electric machine, a compressor, a refrigeration device, and a vehicle.

Background Art

One type of rotary electric machine is an electric motor referred to as a hybrid excitation flux switching motor (HEFSM). For example, a HEFSM disclosed in Japanese Unexamined Patent Application Publication No. 2016-127610 includes a stator core in which a field slot and an armature slot are formed, a rotor core facing the stator core with a predetermined air gap interposed therebetween, a field winding housed in the field slot, an armature winding housed in the armature slot, and a permanent magnet housed in the field slot.

SUMMARY

A first aspect of the present disclosure relates to a rotary electric machine. The rotary electric machine includes a rotor, and a stator facing the rotor with a predetermined gap interposed therebetween. The stator has a stator core formed in a substantially circular annular shape and provided with an armature slot and a field slot alternately arranged in a circumferential direction, an armature winding housed in the armature slot, and a field winding and a first field magnet housed in the field slot. The armature winding is configured to generate a rotating magnetic field to rotate the rotor by being supplied with an alternating-current armature current. The field winding is configured to generate a field flux by being supplied with a direct-current field current. The first field magnet is configured to change a magnetic force by the field flux.

BRIEF DESCRIPTION OF THE DRAWINGS

FIG. 1 is a cross-sectional view illustrating a configuration of a rotary electric machine apparatus of Embodiment 1.

FIG. 11 is a cross-sectional view illustrating a configuration of a rotary electric machine apparatus of Embodiment 2.

FIG. 23 is a cross-sectional view illustrating a configuration of a rotary electric machine apparatus of Embodiment 5.

DETAILED DESCRIPTION OF EMBODIMENT(S)

First Embodiment

Figure 2:
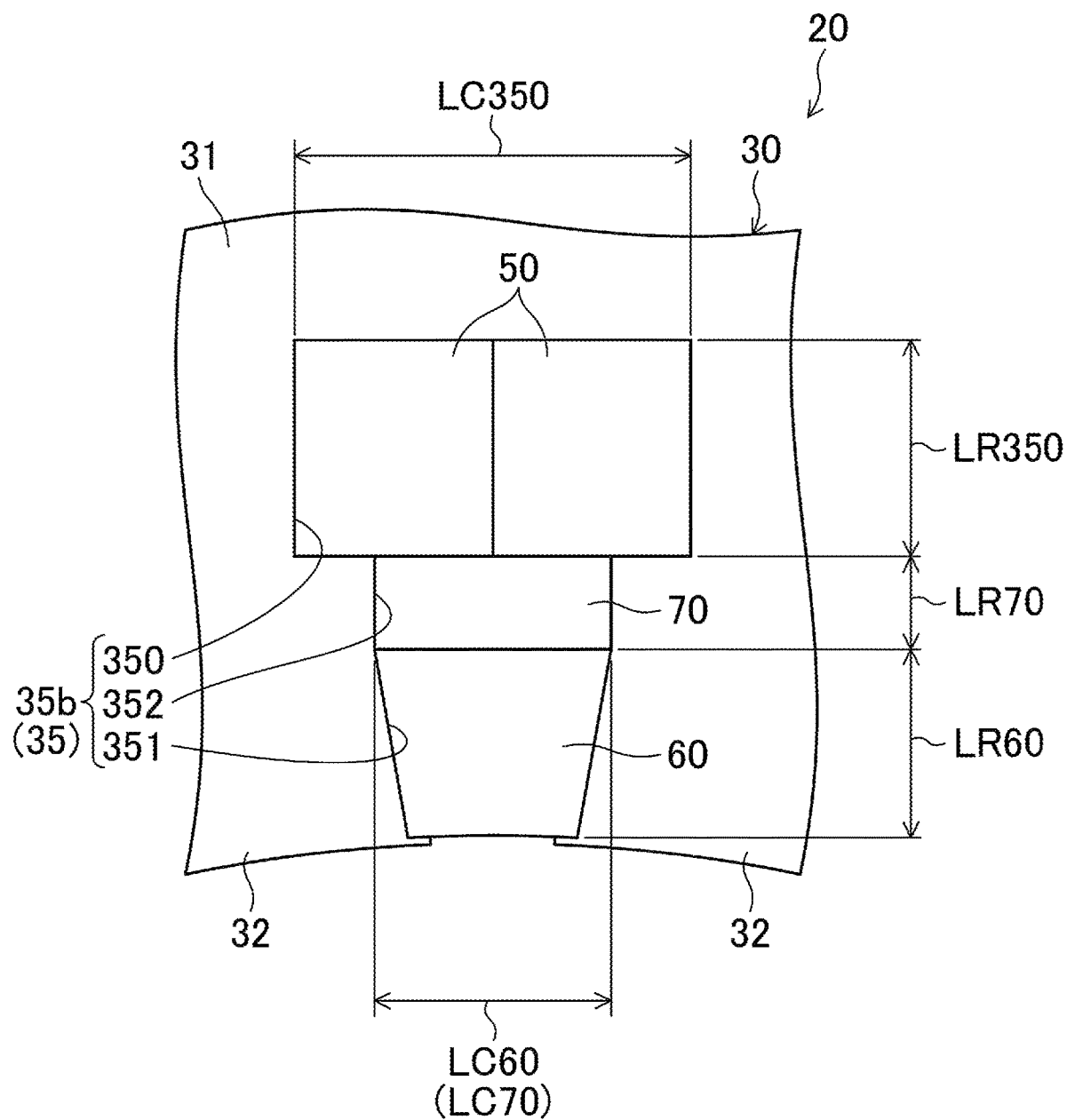
FIG. 2 is a cross-sectional view illustrating a configuration of a main part of the rotary electric machine of Embodiment 1.

Hereinafter, embodiments will be described in detail with reference to the drawings. In the drawings, the same or corresponding portions are denoted by the same reference numerals, and description thereof will not be repeated.

Embodiment 1

FIG. 1 is a view illustrating a configuration of a rotary electric machine apparatus (1) of Embodiment 1. This rotary electric machine apparatus (1) includes a rotary electric machine (2), a control unit (3), and a shaft (4). In this example, the rotary electric machine (2) constitutes an inner rotor type electric motor. Specifically, the rotary electric machine (2) constitutes a hybrid excitation flux switching motor (HEFSM). For example, the rotary electric machine (2) constituting the electric motor can be used in an automobile, an air conditioner, or the like, and drives a transmission of an automobile, a compressor of an air conditioner, or the like by the shaft (4) coupled to a rotor (10) described later.

In the following description, an "axial direction" refers to a direction of a rotation center axis (P) of the rotor (10), and specifically, refers to a direction of the axial center of the shaft (4) described later. A "radial direction" is a direction orthogonal to the axial direction, and a "circumferential direction" is a direction along a rotation direction of the rotor (10). A "radially outer side" ("radially outward") refers to a side farther from the rotation center axis (P), and a "radially inner side" ("radially inward") refers to a side closer to the rotation center axis (P). A "cross section" refers to a section orthogonal to the axial direction.

(Rotary Electric Machine)

The rotary electric machine (2) includes the rotor (10) and a stator (20), and is housed in a casing (not illustrated). The stator (20) faces the rotor (10) with a predetermined gap (G) interposed therebetween.

(Rotor)

The rotor (10) has a rotor core (11). The rotor core (11) is made of a soft magnetic material. For example, the rotor core (11) is constituted by a multilayer core in which a large number of core members manufactured by punching an electromagnetic steel sheet by press working are stacked in the axial direction.

In this example, the rotor core (11) is formed in a gear shape when viewed in the axial direction. Specifically, the rotor core (11) has a rotor yoke (12) and a plurality of protrusions (13). In the example of FIG. 1, the rotor core (11) is provided with ten protrusions (13). The rotor yoke (12) is formed in a circular columnar shape. The plurality of protrusions (13) protrude radially outward from the rotor yoke (12). Also, the plurality of protrusions (13) are arranged at equal pitches in the circumferential direction and face the stator (20) with a slight gap (G) interposed therebetween. A through hole (15) is provided at a central portion of the rotor yoke (12). The shaft (4) is inserted and fixed in the through hole (15).

The plurality of protrusions (13) are provided to vary the magnetic resistance depending on the relative position of the rotor (10) with respect to the stator (20). Thus, the plurality of protrusions (13) do not necessarily have to be arranged at strictly equal pitches. For example, the shape of the rotor (10) viewed in the axial direction may be a shape other than the gear shape. For example, the shape of the rotor (10) may be a perfect circle by providing thin-walled rotor cores (not illustrated) in recessed portions formed between the protrusions (13) of the rotor core (11).

(Stator)

The stator (20) has a stator core (30), a plurality of armature windings (40), a plurality of field windings (50), a plurality of first field magnets (70), and a plurality of second field magnets (60). In the example of FIG. 1, the stator core (30) is provided with twelve armature windings (40), twelve field windings (50), twelve first field magnets (70), and twelve second field magnets (60).

(Stator Core)

The stator core (30) is constituted by a soft magnetic material and formed in a substantially circular annular shape. For example, the stator core (30) is constituted by a multilayer core in which a large number of core members manufactured by punching an electromagnetic steel sheet by press working are stacked in the axial direction.

The stator core (30) has a stator yoke (31) and a plurality of teeth (32). In the example of FIG. 1, the stator core (30) is provided with twenty four teeth (32). The stator yoke (31) is formed in a circular annular shape and constitutes an outer peripheral portion of the stator core (30). The plurality of teeth (32) protrude radially inward from an inner peripheral surface of the stator yoke (31). Also, the plurality of teeth (32) are disposed at equal pitches in the circumferential direction around the rotation center axis (P). Accordingly, a plurality of slots (35) are formed between the plurality of teeth (32).

The plurality of slots (35) formed between the plurality of teeth (32) are roughly divided into armature slots (35a) and field slots (35b). Specifically, the armature slots (35a) are slots (35) that are alternately adjacent to each other in the circumferential direction among the plurality of slots (35), and the field slots (35b) are slots (35) other than the armature slots (35a) among the plurality of slots (35). In other words, in the stator core (30), the armature slots (35a) and the field slots (35b) are alternately arranged in the circumferential direction.

In the example of FIG. 1, twenty four slots (35) are provided in the stator core (30). Among the twenty four slots (35), twelve slots (35) that are alternately adjacent to each other in the circumferential direction constitute twelve armature slots (35a), and the remaining twelve slots (35) constitute twelve field slots (35b).

In the following description, when attention is focused on a specific component among a plurality of components such as the teeth (32), the armature slots (35a), and the field slots (35b), a branch number is added to the reference sign of the component. For example, the reference sign of a specific tooth (32) is denoted as "32-1".

(Armature Winding)

The plurality of armature windings (40) have configurations similar to one another. The armature windings (40) are housed in the armature slots (35a). The armature windings (40) are supplied with an alternating-current armature current (i40) to generate a rotating magnetic field for rotating the rotor (10). For example, the armature windings (40) each are a three-phase armature winding, and the armature current (i40) that is supplied to the armature winding (40) is a three-phase alternating current.

In this example, the plurality of armature windings (40) are housed in the plurality of armature slots (35a) and wound around the plurality of teeth (32). Specifically, one armature winding (40) is wound around a pair of teeth (32) (hereafter, referred to as "a pair of armature teeth (32a)") sandwiched between a pair of armature slots (35a) adjacent to each other in the circumferential direction. In other words, a pair of armature teeth (32a) are regarded as one tooth, and one armature winding (40) is wound around the tooth by concentrated winding. Specifically, the armature winding (40) is wound around the pair of armature teeth (32a) with an axis along the radial direction as a winding axis.

Describing specifically with reference to FIG. 1, an armature winding (40-1) is wound around a pair of armature teeth (32a) constituted by two teeth (32-1, 32-2) sandwiched between two armature slots (35a-1, 35a-2) adjacent to each other in the circumferential direction.

(Field Winding)

The plurality of field windings (50) have configurations similar to one another. The field windings (50) are housed in the field slots (35b). The field windings (50) are supplied with a direct-current field current (i50) to generate a field flux (M50).

In this example, a plurality of field windings (50) are housed in a plurality of field slots (35*b*) and wound around a plurality of teeth (32). Specifically, one field winding (50) is wound around a pair of teeth (32) (hereafter, referred to as "a pair of field teeth (32*b*)") sandwiched between a pair of field slots (35*b*) adjacent to each other in the circumferential direction. In other words, a pair of field teeth (32*b*) are regarded as one tooth, and one field winding (50) is wound around the tooth by concentrated winding. Specifically, the field winding (50) is wound around the pair of field teeth (32*b*) with an axis along the radial direction as a winding axis.

Describing specifically with reference to FIG. 1, a field winding (50-1) is wound around a pair of field teeth (32*b*) constituted by two teeth (32-2, 32-3) sandwiched between two field slots (35*b*-1, 35*b*-2) adjacent to each other in the circumferential direction.

In this example, the plurality of field windings (50) are connected in series or in parallel so that a common field current (i50) flows through the plurality of field windings (50). The plurality of field windings (50) are wound around a plurality of pairs of field teeth (32*b*) so that winding directions of two field windings (50) adjacent to each other in the circumferential direction are opposite to each other.

(Flux of Field Winding: Field Flux)

The field flux (M50) generated around the field winding (50) housed in the field slot (35*b*) includes a flux circulating in the stator core (30) and a flux interlinking with the rotor core (11). In the following description, the flux included in the field flux (M50) and circulating in the stator core (30) is referred to as a "short-circuit flux (M51)", and the flux included in the field flux (M50) and interlinking with the rotor core (11) is referred to as an "interlinkage flux (M52)". The short-circuit flux (M51) passes through the first field magnet (70). The interlinkage flux (M52) passes through the rotor core (11). The short-circuit flux (M51) is used to magnetize the first field magnet (70). The interlinkage flux (M52) contributes to an improvement in rotational torque of the rotor (10).

(First Field Magnet)

The plurality of first field magnets (70) have configurations similar to one another. The first field magnets (70) are housed in the field slots (35*b*). In this example, the first field magnets (70) each have a rectangular cross section, and have a constant circumferential length from the radially inner side to the radially outer side. The axial length of the first field magnet (70) is substantially the same as the axial length of the stator core (30).

The first field magnet (70) is disposed magnetically in parallel with the second field magnet (60) corresponding to the first field magnet (70). With such a configuration, the flow direction of the flux of the first field magnet (70) can be made the same as or opposite to the flow direction of the flux of the second field magnet (60).

The magnetic force of the first field magnet (70) can be changed by the field flux (M50) of the field winding (50) corresponding to the first field magnet (70). Specifically, the amount and direction of magnetization of the first field magnet (70) are changed by the field flux (M50) of the field winding (50), and the magnetic force can be changed by this change. In this example, the short-circuit flux (M51) of the field winding (50) of the field slot (35*b*) passes through the first field magnet (70) of the field slot (35*b*). The magnitude and direction of the magnetic force of the first field magnet (70) can be changed by the short-circuit flux (M51) passing through the first field magnet (70). In other words, the first field magnet (70) can change the magnetized state, that is, the magnitude and direction of magnetization, by the short-circuit flux (M51) passing through the first field magnet (70) after the short-circuit flux (M51) is removed. Generally, increasing or maximizing the magnitude of magnetization is referred to as "magnetizing", and decreasing the magnitude of magnetization or bringing the magnetization to substantially zero is referred to as "demagnetizing".

In this example, the first field magnet (70) is disposed radially outward of the second field magnet (60). The first field magnet (70) is magnetized so that the pole faces face in the circumferential direction. In other words, the first field magnet (70) can be magnetized in the circumferential direction, and the magnetization direction can be a direction along the circumferential direction. Also, in this example, the plurality of first field magnets (70) are magnetized so that the pole faces having the same polarity face each other in the circumferential direction. In other words, the plurality of first field magnets (70) are magnetized so that their magnetization directions are along the circumferential direction and their pole faces having alternately different polarities are oriented toward one side in the circumferential direction.

(Flux of First Field Magnet: First Magnet Flux)

The flux of the first field magnet (70) includes a flux circulating in the stator core (30) and a flux interlinking with the rotor core (11). In the following description, the flux of the first field magnet (70) is referred to as a "first magnet flux (M70)", the flux included in the first magnet flux (M70) and circulating in the stator core (30) is referred to as a "first short-circuit flux (M71)", and the flux included in the first magnet flux (M70) and interlinking with the rotor core (11) is referred to as a "first interlinkage flux (M72)".

(Second Field Magnet)

The plurality of second field magnets (60) have configurations similar to one another. The second field magnets (60) are housed in the field slots (35*b*). In this example, the second field magnets (60) each have a trapezoidal cross section, and have a circumferential length that gradually increases from the radially inner side to the radially outer side. The axial length of the second field magnet (60) is substantially the same as the axial length of the stator core (30). The shape of the cross section of the second field magnet (60) is not limited to a trapezoidal shape.

Pole faces of the second field magnet (60) face in the circumferential direction. In other words, the second field magnet (60) is magnetized in the circumferential direction, and the magnetization direction is a direction along the circumferential direction. In this example, the plurality of second field magnets (60) are respectively disposed in the plurality of field slots (35*b*) so that the pole faces having the same polarity face each other in the circumferential direction. In other words, the plurality of second field magnets (60) are magnetized so that their magnetization directions are along the circumferential direction and their pole faces having alternately different polarities are oriented toward one side in the circumferential direction.

(Flux of Second Field Magnet: Second Magnet Flux)

The flux of the second field magnet (60) includes a flux circulating in the stator core (30) and a flux interlinking with the rotor core (11). In the following description, the flux of the second field magnet (60) is referred to as a "second magnet flux (M60)", the flux included in the second magnet flux (M60) and circulating in the stator core (30) is referred to as a "second short-circuit flux (M61)", and the flux included in the second magnet flux (M60) and interlinking with the rotor core (11) is referred to as a "second interlinkage flux (M62)".

(Forward Direction and Reverse Direction)

In the following description, the magnetization direction of the first field magnet (70) when the flow direction of the first interlinkage flux (M72) of the first field magnet (70) is the same as the flow direction of the second interlinkage flux (M62) of the second field magnet (60) corresponding to the first field magnet (70) is referred to as a "forward direction". The magnetization direction of the first field magnet (70) when the flow direction of the first interlinkage flux (M72) of the first field magnet (70) is opposite to the flow direction of the second interlinkage flux (M62) of the second field magnet (60) corresponding to the first field magnet (70) is referred to as a "reverse direction". "The second field magnet (60) corresponding to the first field magnet (70)" refers to the second field magnet (60) housed in the common field slot (35b) together with the first field magnet (70).

(Magnetized State and Demagnetized State)

The first field magnet (70) can be switched between a magnetized state and a demagnetized state by changing the magnetic force with the field flux (M50). The magnetized state is a state having an effective magnetic force. The demagnetized state is a state in which the magnetic force is substantially zero. For example, in the magnetized state, the first interlinkage flux (M72) of the first field magnet (70) interlinks with the rotor core (11), and in the demagnetized state, the first interlinkage flux (M72) of the first field magnet (70) does not interlink with the rotor core (11). The magnetized state includes a first magnetized state in which the direction of the magnetic force (magnetization direction) of the first field magnet (70) is the forward direction, and a second magnetized state in which the direction of the magnetic force (magnetization direction) of the first field magnet (70) is the reverse direction.

(Magnetic Characteristics of Field Magnet)

The second field magnet (60) is configured so that a change in magnetic force by the field flux (M50) of the field winding (50) is not generated as much as possible. The first field magnet (70) is configured so that the magnetic force is changed by the field flux (M50) of the field winding (50).

In this example, within the operating temperature range of the rotary electric machine (2), the maximum value of the coercive force of the first field magnet (70) is smaller than the minimum value of the coercive force of the second field magnet (60). For example, the upper limit of the operating temperature range of the rotary electric machine (2) is any one of 100° C., 150° C., and 200° C., and the lower limit of the operating temperature range of the rotary electric machine (2) is either one of 0° C. and −50° C.

For example, the product of "the residual flux density of the second field magnet (60)" and "the pole area of the second field magnet (60)" may be larger than the product of "the residual flux density of the first field magnet (70)" and "the pole area of the first field magnet (70)".

The second field magnet (60) is a magnet in which substantially no irreversible change in magnetic force is generated when the field current (i50) flows through the field winding (50). The second field magnet (60) includes a magnet in which an unintended slight irreversible change in magnetic force is generated during operation. In other words, the second field magnet (60) is a magnet in which an irreversible change in magnetic force is relatively less likely to be generated when the field current (i50) flows through the field winding (50). Specifically, the second field magnet (60) is a magnet in which an irreversible change in magnetic force is less likely to be generated than the first field magnet (70) when the field current (i50) flows through the field winding (50). The second field magnet (60) is a magnet used in a fixed magnetization direction. For example, the second field magnet (60) is desirably a magnet used with a change in magnetization rate of 5% or less.

The first field magnet (70) is a magnet in which an irreversible change in magnetic force is generated when the field current (i50) flows through the field winding (50). In other words, the first field magnet (70) is a magnet in which an irreversible change in magnetic force is relatively likely to be generated when the field current (i50) flows through the field winding (50). For example, the first field magnet (70) may be a magnet used with a change in magnetization direction. For example, the first field magnet (70) may be a magnet having a coercive force of ½ or less of that of the second field magnet (60) at room temperature (for example, 25° C.). For example, the first field magnet (70) is a magnet used with a change in magnetization rate of approximately 30% or more (desirably 50% or more).

(Configuration in Field Slot)

FIG. 2 is a view illustrating a configuration in a field slot (35b) in Embodiment 1. The field slot (35b) includes a winding housing portion (350) housing the field winding (50), a second magnet housing portion (351) housing the second field magnet (60), and a first magnet housing portion (352) housing the first field magnet (70).

In Embodiment 1, the first magnet housing portion (352) is disposed radially outward of the second magnet housing portion (351), and the winding housing portion (350) is disposed radially outward of the first magnet housing portion (352). With such a configuration, in Embodiment 1, the first field magnet (70) is disposed radially outward of the second field magnet (60) in the field slot (35b), and the field winding (50) is disposed radially outward of the first field magnet (70) in the field slot (35b).

In Embodiment 1, a circumferential length (LC70) of the first field magnet (70) is equal to or smaller than a circumferential length (LC60) of a portion on the radially outer side of the second field magnet (60) and equal to or smaller than a circumferential length (LC350) of a portion on the radially inner side of the winding housing portion (350) of the field slot (35b).

In the example of FIG. 2, the first magnet housing portion (352) communicates with the second magnet housing portion (351), and the winding housing portion (350) communicates with the first magnet housing portion (352). The first field magnet (70) is adjacent to the radially outer side of the second field magnet (60), and the field winding (50) is adjacent to the radially outer side of the first field magnet (70). The circumferential length (LC70) of the first field magnet (70) is equal to the circumferential length (LC60) of the portion on the radially outer side of the second field magnet (60), and is shorter than the circumferential length (LC350) of the portion on the radially inner side of the winding housing portion (350). The radial length (LR70) of the first field magnet (70) is shorter than the circumferential length (LC70) of the first field magnet (70). The radial length (LR70) of the first field magnet (70) is shorter than a radial length (LR60) of the second field magnet (60) and a radial length (LR350) of the winding housing portion (350). Accordingly, in particular, since the first field magnet (70) does not have a corner portion protruding from the stator core (30), application of a strong demagnetizing field due to a fringing flux or the like can be avoided, and demagnetization can be prevented in a case of operation without changing the magnetic force.

In the example of FIG. 2, the second field magnet (60) faces the rotor core (11) with a predetermined gap (G) interposed therebetween. Hence, a strong demagnetizing field is likely to be applied to the second field magnet (60) due to a fringing flux or the like. Thus, it is desirable to increase the coercive force of the second field magnet (60). For example, the second field magnet (60) may be a magnet using a rare-earth element (so-called rare-earth magnet). Specifically, the second field magnet (60) is desirably a rare-earth magnet (neodymium-iron-boron-based magnet) containing neodymium, iron, and boron as main components. Also, the second field magnet (60) is preferably a sintered magnet. Alternatively, the second field magnet (60) may be a bonded magnet. Similarly to the second field magnet (60), for example, the first field magnet (70) may be a neodymium-iron-boron-based magnet. Alternatively, the first field magnet (70) may be an alnico magnet, a samarium-cobalt magnet, or a ferrite-based magnet.

(Control Unit)

As illustrated in FIG. 1, the control unit (3) supplies the armature current (i40) to the armature winding (40) and supplies the field current (i50) to the field winding (50). The control unit (3) controls the operation of the rotary electric machine (2) by controlling the armature current (i40) and the field current (i50). In this example, the control unit (3) has a power source (81) and a control circuit (82).

(Power Source)

The power source (81) has an armature power source unit (81*a*) and a field power source unit (81*b*).

The armature power source unit (81*a*) is electrically connected to the plurality of armature windings (40). The armature power source unit (81*a*) supplies the alternating-current armature current (i40) to the plurality of armature windings (40) in response to control by the control circuit (82). A well-known power source configuration can be adopted for the configuration of the armature power source unit (81*a*). For example, the armature power source unit (81*a*) may be constituted by an inverter.

The field power source unit (81*b*) is electrically connected to the plurality of field windings (50). The field power source unit (81*b*) supplies the direct-current field current (i50) to the plurality of field windings (50) in response to control by the control circuit (82). A well-known power source configuration can be adopted for the configuration of the field power source unit (81*b*). For example, the field power source unit (81*b*) may be constituted by an inverter. For example, the field current (i50) that is supplied during magnetization or demagnetization of the first field magnet (70) may be a pulsed direct current that flows for an extremely short time.

(Control Circuit)

The control circuit (82) controls the operation of the rotary electric machine (2) by controlling the power source (81). Specifically, the control circuit (82) controls the power source (81) so that the rotary electric machine (2) performs a desired operation based on outputs of various sensors (not illustrated) that detect various parameters of the rotary electric machine (2). For example, the control circuit (82) includes a processor and a memory that is electrically connected to the processor and stores a program and information for operating the processor.

(Operation of Control Unit)

The control unit (3) of Embodiment 1 selectively performs first magnetic force control, second magnetic force control, first rotation control, second rotation control, third rotation control, fourth rotation control, fifth rotation control, and sixth rotation control.

In the following description, three armature slots (35*a*) arranged in the circumferential direction are referred to as an "armature slot (35*a*-1)", an "armature slot (35*a*-2)", and an "armature slot (35*a*-3)". A first field slot (35*b*) disposed between the first and second armature slots (35*a*-1, 35*a*-2) is referred to as a "field slot (35*b*-1)". A second field slot (35*b*) disposed between the second and third armature slots (35*a*-2, 35*a*-3) is referred to as a "field slot (35*b*-2)".

A first tooth (32) sandwiched between the first armature slot (35*a*-1) and the first field slot (35*b*-1) is referred to as a "tooth (32-1)". A second tooth (32) sandwiched between the first field slot (35*b*-1) and the second armature slot (35*a*-2) is referred to as a "tooth (32-2)". A third tooth (32) sandwiched between the second armature slot (35*a*-2) and the second field slot (35*b*-2) is referred to as a "tooth (32-3)". A fourth tooth (32) sandwiched between the second field slot (35*b*-2) and the third armature slot (35*a*-3) is referred to as a "tooth (32-4)".

A first field magnet (70) and a second field magnet (60) housed in the first field slot (35*b*-1) are referred to as a "first field magnet (70-1)" and a "second field magnet (60-1)", respectively. A first field magnet (70) and a second field magnet (60) housed in the second field slot (35*b*-2) are referred to as a "first field magnet (70-2)" and a "second field magnet (60-2)", respectively.

(First Magnetic Force Control)

Figure 3:
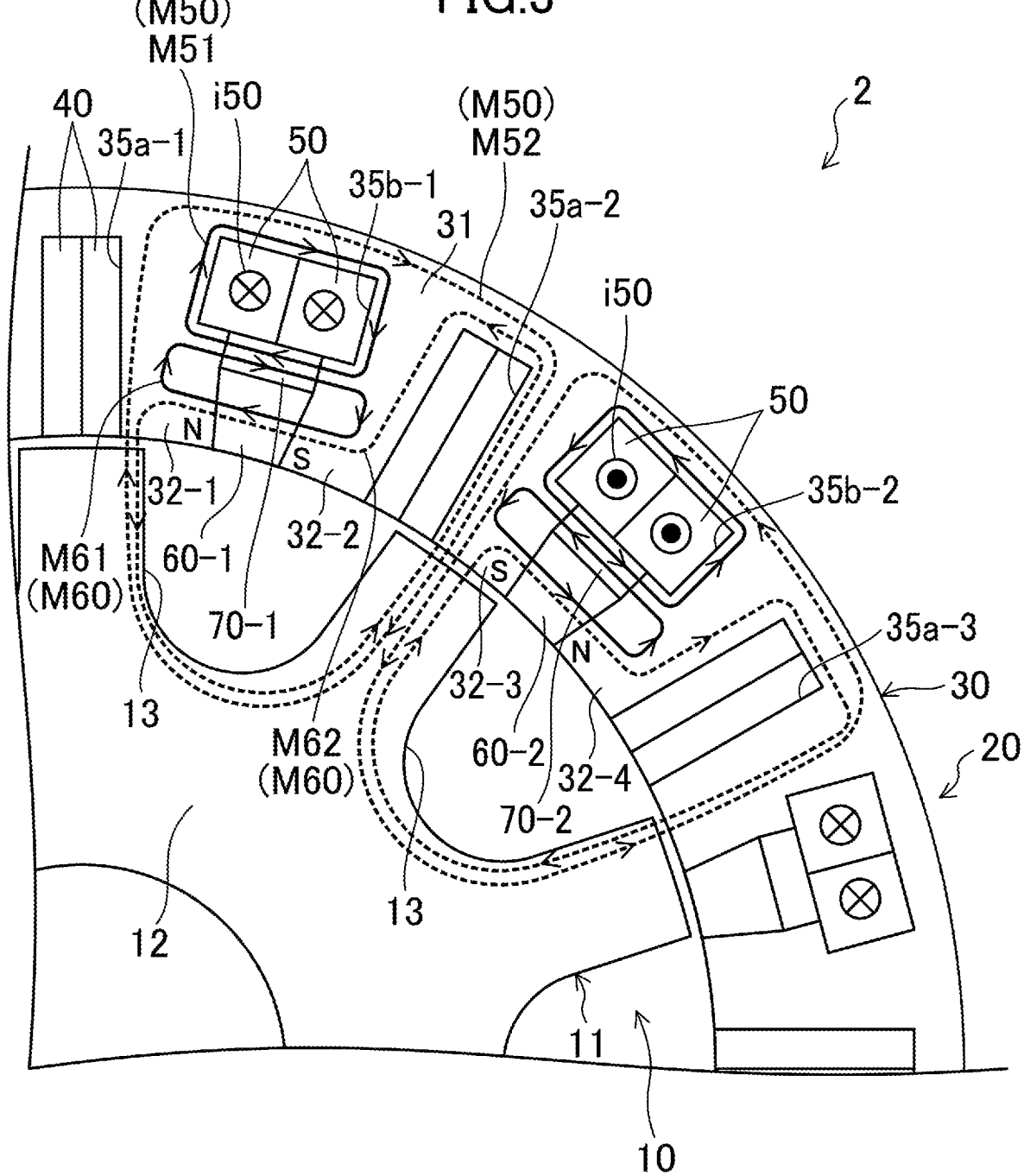
FIG. 3 is a cross-sectional view illustrating a flow of flux under first magnetic force control of Embodiment 1.

FIG. 3 is a view illustrating a flow of flux under the first magnetic force control of Embodiment 1.

In the first magnetic force control, the control unit (3) supplies the field current (i50) to the plurality of field windings (50). In each of the plurality of field slots (35*b*), the control unit (3) controls the field current (i50) that is supplied to the plurality of field windings (50) so that the short-circuit flux (M51) of the field winding (50) of the field slot (35*b*) passes through the first field magnet (70) of the field slot (35*b*) in the forward direction. Accordingly, the first field magnet (70) is magnetized in the forward direction in each of the plurality of field slots (35*b*).

In this example, the field current (i50) that is supplied to the field winding (50) under the first magnetic force control is a quasi-impulse current (pulsed direct current) flowing for an extremely short time (for example, less than 10 msec). The absolute value of the field current (i50) that is supplied to the field winding (50) under the first magnetic force control is larger than the absolute value of the field current (i50) that is supplied to the field winding (50) under rotation control (specifically, second rotation control, fourth rotation control, sixth rotation control) described later. For example, the absolute value of the field current (i50) under the first magnetic force control is about 1.5 to 10 times the maximum value of the field current (i50) under the rotation control.

For example, in the first magnetic force control, the control unit (3) may supply the field current (i50) to the field winding (50) so that a high-level period (energization period) of the field current (i50) continues for a predetermined time. For example, in the first magnetic force control, the control unit (3) may supply the field current (i50) to the field winding (50) so that the field current (i50) becomes a plurality of pulses that are continuous at predetermined intervals in a predetermined period.

In the first magnetic force control, the control unit (3) supplies the armature current (i40) to the plurality of armature windings (40) as necessary. For example, when the inertia of the load of the rotary electric machine (2) is large, the armature current (i40) may be supplied under the first magnetic force control. Details of the flux under the first magnetic force control are as follows.

(Flux of Field Winding: Short-Circuit Flux)

In the first magnetic force control, the short-circuit flux (M51) of the field winding (50) of the field slot (35*b*-1) flows from the stator yoke (31), passes through the tooth (32-2), the first field magnet (70-1), and the tooth (32-1) in this order, and returns to the stator yoke (31). As described above, the short-circuit flux (M51) of the field winding (50) of the field slot (35*b*-1) circulates around the field winding (50) of the field slot (35*b*-1) in the clockwise direction. The flow direction of the short-circuit flux (M51) of the field winding (50) of the field slot (35*b*-2) is opposite to the flow direction of the short-circuit flux (M51) of the field winding (50) of the field slot (35*b*-1).

(Flux of Field Winding: Interlinkage Flux)

In the first magnetic force control, the interlinkage flux (M52) of the field winding (50) of the field slot (35*b*-1) flows from the stator yoke (31), passes through the tooth (32-3), the rotor core (11), and the tooth (32-1) in this order, and returns to the stator yoke (31). As described above, the interlinkage flux (M52) of the field winding (50) of the field slot (35*b*-1) circulates through the stator core (30) and the rotor core (11) in the clockwise direction. The flow direction of the interlinkage flux (M52) of the field winding (50) of the field slot (35*b*-2) is opposite to the flow direction of the interlinkage flux (M52) of the field winding (50) of the field slot (35*b*-1).

(Flux of Second Field Magnet: Second Short-Circuit Flux)

In the first magnetic force control, the second short-circuit flux (M61) of the second field magnet (60-1) flows from the second field magnet (60-1), passes through the tooth (32-1), the first field magnet (70-1), and the tooth (32-2) in this order, and returns to the second field magnet (60-1). As described above, the second short-circuit flux (M61) of the second field magnet (60-1) circulates around the second field magnet (60-1) and the first field magnet (70-1) in the clockwise direction. The flow direction of the second short-circuit flux (M61) of the second field magnet (60-2) is opposite to the flow direction of the second short-circuit flux (M61) of the second field magnet (60-1).

(Flux of Second Field Magnet: Second Interlinkage Flux)

In the first magnetic force control, the second interlinkage flux (M62) of the second field magnet (60-1) flows from the second field magnet (60-1), passes through the tooth (32-1), the rotor core (11), the tooth (32-3), the stator yoke (31), and the tooth (32-2) in this order, and returns to the second field magnet (60-1). As described above, the second interlinkage flux (M62) of the second field magnet (60-1) circulates through the stator core (30) and the rotor core (11) in the counterclockwise direction. The flow direction of the second interlinkage flux (M62) of the second field magnet (60-2) is opposite to the flow direction of the second interlinkage flux (M62) of the second field magnet (60-1).

(Advantageous Effects of First Magnetic Force Control)

As described above, by performing the first magnetic force control, the magnitude and direction of the magnetic force of the first field magnet (70) can be changed so that the magnetic force of the first field magnet (70) becomes stronger in the forward direction. Specifically, when the state of the first field magnet (70) is "the first magnetized state in which the magnetization direction of the first field magnet (70) is the forward direction", the magnetic force acting on the first field magnet (70) in the forward direction can be strengthened. When the state of the first field magnet (70) is "the second magnetized state in which the magnetization direction of the first field magnet (70) is the reverse direction", the magnetic force acting in the opposite direction of the first field magnet (70) can be weakened. Also, the state of the first field magnet (70) can be switched from the second magnetized state to the demagnetized state, and further switched from the demagnetized state to the first magnetized state.

(Second Magnetic Force Control)

Figure 4:
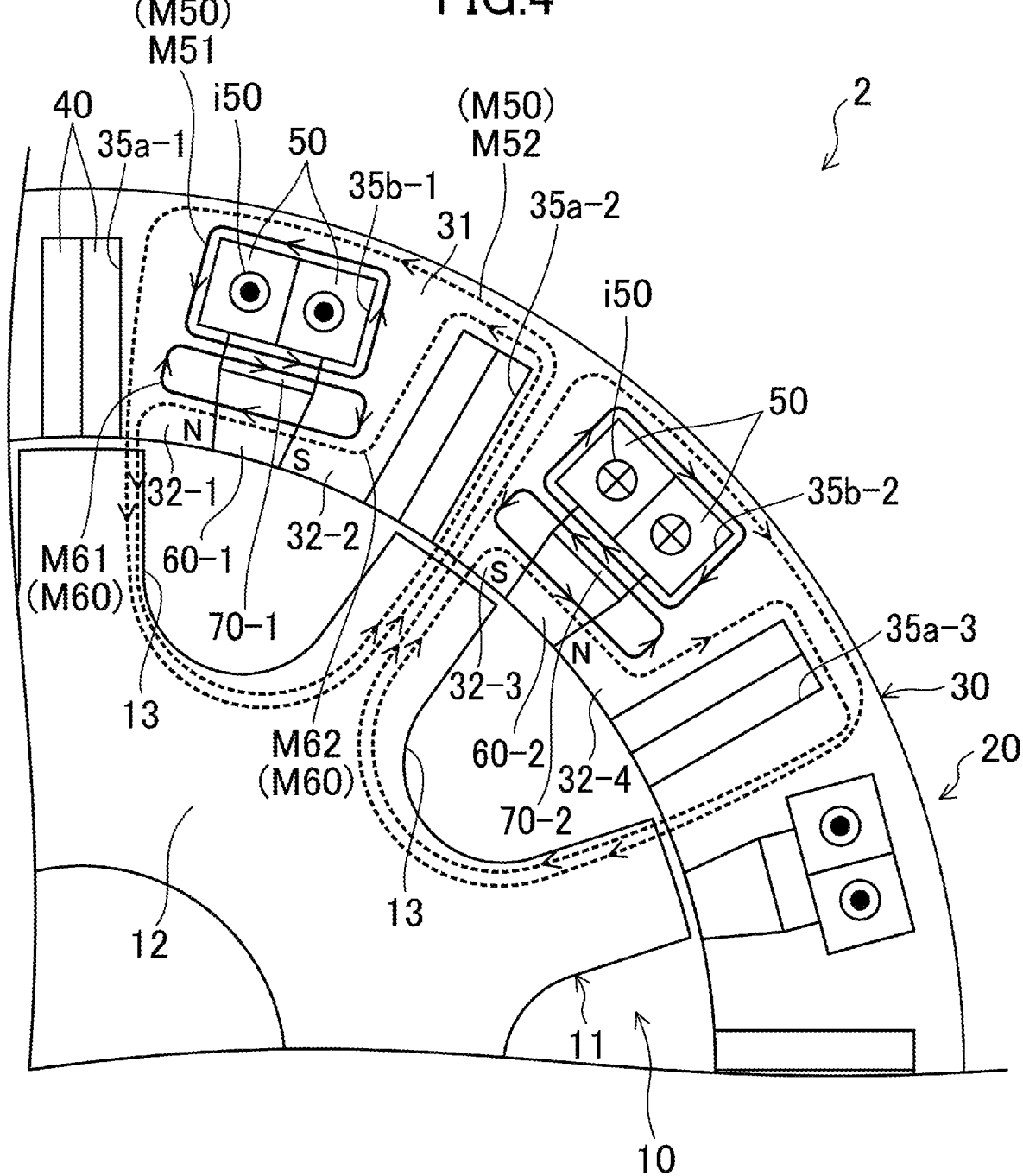
FIG. 4 is a cross-sectional view illustrating a flow of flux under second magnetic force control of Embodiment 1.

FIG. 4 is a view illustrating a flow of flux under the second magnetic force control of Embodiment 1.

In the second magnetic force control, the control unit (3) supplies the field current (i50) to the plurality of field windings (50). In each of the plurality of field slots (35*b*), the control unit (3) controls the field current (i50) that is supplied to the plurality of field windings (50) so that the short-circuit flux (M51) of the field winding (50) of the field slot (35*b*) passes through the first field magnet (70) of the field slot (35*b*) in the reverse direction. Accordingly, in each of the plurality of field slots (35*b*), the first field magnet (70) is magnetized in the reverse direction.

In this example, similarly to the first magnetic force control, the field current (i50) that is supplied to the field winding (50) under the second magnetic force control is a quasi-impulse current (pulsed direct current) flowing for an extremely short time. The absolute value of the field current (i50) that is supplied to the field winding (50) under the second magnetic force control is larger than the absolute value of the field current (i50) that is supplied to the field winding (50) under rotation control (specifically, second rotation control, fourth rotation control, sixth rotation control) described later. For example, the absolute value of the field current (i50) under the second magnetic force control is about 1.5 to 10 times the maximum value of the field current (i50) under the rotation control.

Similarly to the first magnetic force control, in the second magnetic force control, the control unit (3) supplies the armature current (i40) to the plurality of armature windings (40) as necessary. For example, when the inertia of the load of the rotary electric machine (2) is large, the armature current (i40) may be supplied under the second magnetic force control.

Details of the flux under the second magnetic force control are as follows.

(Flux of Field Winding: Short-Circuit Flux)

The flow direction of the short-circuit flux (M51) under the second magnetic force control is opposite to the flow direction of the short-circuit flux (M51) under the first magnetic force control. Specifically, in the second magnetic force control, the short-circuit flux (M51) of the field winding (50) of the field slot (35*b*-1) flows from the stator yoke (31), passes through the tooth (32-1), the first field magnet (70-1), and the tooth (32-2) in this order, and returns to the stator yoke (31). As described above, the short-circuit flux (M51) of the field winding (50) of the field slot (35*b*-1) circulates around the field winding (50) of the field slot (35*b*-1) in the counterclockwise direction. The flow direction of the short-circuit flux (M51) of the field winding (50) of the field slot (35*b*-2) is opposite to the flow direction of the short-circuit flux (M51) of the field winding (50) of the field slot (35*b*-1).

(Flux of Field Winding: Interlinkage Flux)

The flow direction of the interlinkage flux (M52) under the second magnetic force control is opposite to the flow direction of the interlinkage flux (M52) under the first magnetic force control. Specifically, in the second magnetic force control, the interlinkage flux (M52) of the field winding (50) of the field slot (35*b*-1) flows from the stator yoke (31), passes through the tooth (32-1), the rotor core (11), and the tooth (32-3) in this order, and returns to the stator yoke (31). As described above, the interlinkage flux (M52) of the field winding (50) of the field slot (35*b*-1) circulates through the stator core (30) and the rotor core (11) in the counterclockwise direction. The flow direction of the interlinkage flux (M52) of the field winding (50) of the field slot (35b-2) is opposite to the flow direction of the interlinkage flux (M52) of the field winding (50) of the field slot (35b-1).
(Flux of Second Field Magnet)

The second magnet flux (M60) (specifically, the second short-circuit flux (M61) and the second interlinkage flux (M62) under the second magnetic force control is similar to the second magnet flux (M60) under the first magnetic force control.
(Advantageous Effects of Second Magnetic Force Control)

As described above, by performing the second magnetic force control, the magnitude and direction of the magnetic force of the first field magnet (70) can be changed so that the magnetic force of the first field magnet (70) becomes stronger in the reverse direction. Specifically, when the state of the first field magnet (70) is "the first magnetized state in which the magnetization direction of the first field magnet (70) is the forward direction", the magnetic force acting on the first field magnet (70) in the forward direction can be weakened. When the state of the first field magnet (70) is "the second magnetized state in which the magnetization direction of the first field magnet (70) is the opposite direction", the magnetic force acting in the opposite direction of the first field magnet (70) can be strengthened. Also, the state of the first field magnet (70) can be switched from the first magnetized state to the demagnetized state, and further switched from the demagnetized state to the second magnetized state.

In the second magnetic force control, the direction in which the second short-circuit flux (M61) of the second field magnet (60) passes through the first field magnet (70) is the reverse direction (that is, the reverse direction opposite to the forward direction of the magnetization direction of the first field magnet (70). Accordingly, in the second magnetic force control, magnetization of the first field magnet (70) in the reverse direction by the short-circuit flux (M51) of the field winding (50) can be promoted. Thus, the absolute value of the field current (i50) under the second magnetic force control can be made smaller than the absolute value of the field current (i50) under the first magnetic force control, and copper loss of the rotary electric machine (2) can be reduced. For example, the absolute value of the field current (i50) under the second magnetic force control can be set to ½ of the absolute value of the field current (i50) under the first magnetic force control.
(First Rotation Control)

Figure 5:
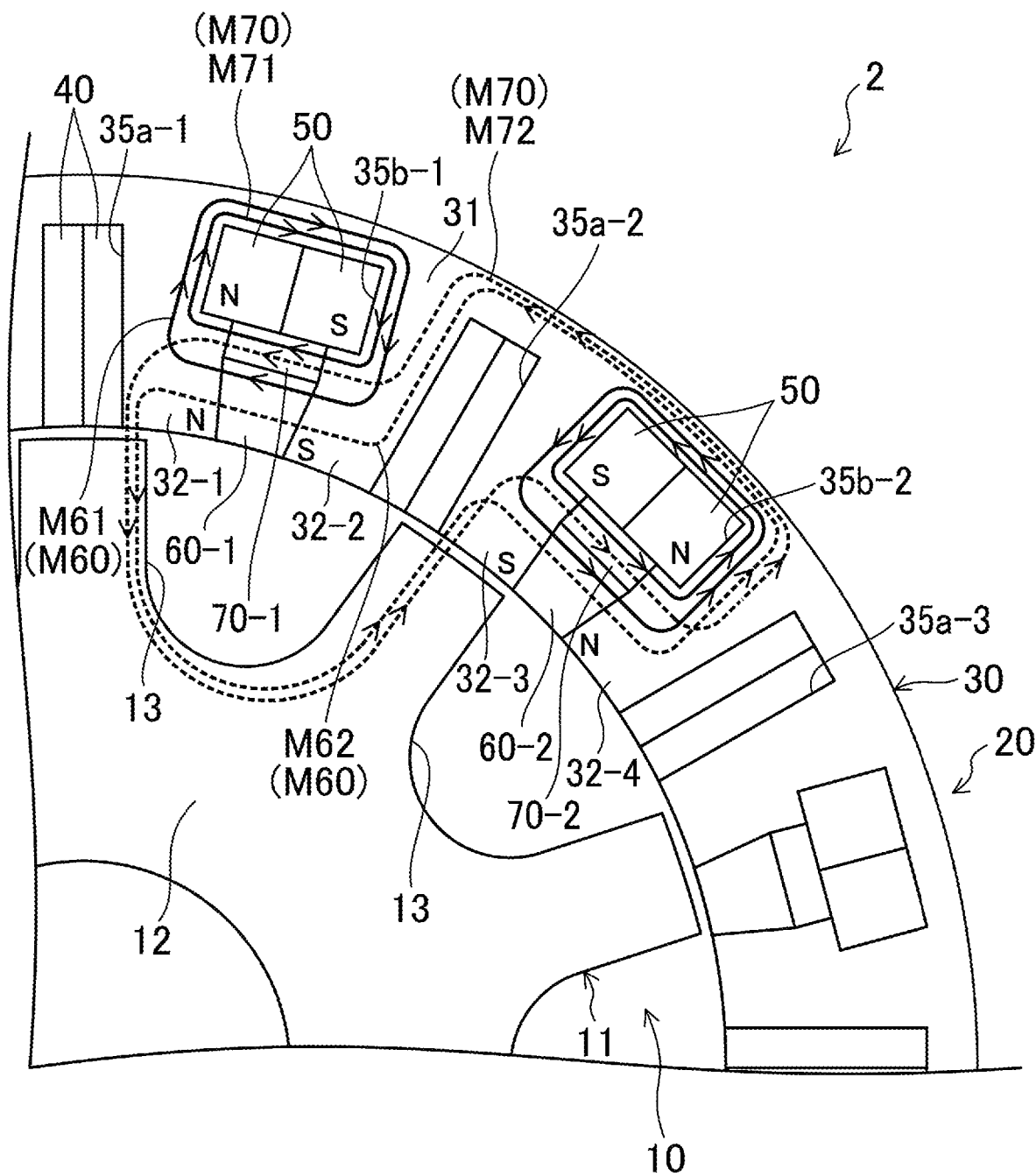
FIG. 5 is a cross-sectional view illustrating a flow of flux under first rotation control of Embodiment 1.

FIG. 5 is a view illustrating a flow of flux under the first rotation control of Embodiment 1.

In the first rotation control, the magnetization direction of the first field magnet (70) is set to the forward direction in each of the plurality of field slots (35b). Accordingly, the flow direction of the first interlinkage flux (M72) of the first field magnet (70) of the field slot (35b) is the same as the flow direction of the second interlinkage flux (M62) of the second field magnet (60) of the field slot (35b).

In the first rotation control, the control unit (3) supplies the armature current (i40) to the plurality of armature windings (40). Accordingly, the rotor (10) rotates. The control unit (3) does not supply the field current (i50) to the plurality of field windings (50). Details of the flux under the first rotation control are as follows.
(Flux of First Field Magnet: First Short-Circuit Flux)

In the first rotation control, the first short-circuit flux (M71) of the first field magnet (70-1) flows from the first field magnet (70-1), passes through the tooth (32-1), the stator yoke (31), and the tooth (32-2) in this order, and returns to the first field magnet (70-1). As described above, the first short-circuit flux (M71) of the first field magnet (70-1) circulates around the field winding (50) of the field slot (35b-1) in the clockwise direction. The flow direction of the first short-circuit flux (M71) of the first field magnet (70-2) is opposite to the flow direction of the first short-circuit flux (M71) of the first field magnet (70-1).
(Flux of First Field Magnet: First Interlinkage Flux)

In the first rotation control, the first interlinkage flux (M72) of the first field magnet (70-1) and the first interlinkage flux (M72) of the first field magnet (70-2) are combined. The first interlinkage flux (M72) of the first field magnets (70-1, 70-2) flows from the first field magnet (70-1), passes through the tooth (32-1), the rotor core (11), the tooth (32-3), the first field magnet (70-2), the tooth (32-4), the stator yoke (31), and the tooth (32-2) in this order, and returns to the first field magnet (70-1). As described above, the first interlinkage flux (M72) of the first field magnets (70-1, 70-2) circulates through the stator core (30) and the rotor core (11) in the counterclockwise direction.
(Flux of Second Field Magnet: Second Short-Circuit Flux)

In the first rotation control, the second short-circuit flux (M61) of the second field magnet (60-1) flows from the second field magnet (60-1), passes through the tooth (32-1), the stator yoke (31), and the tooth (32-2) in this order, and returns to the second field magnet (60-1). As described above, the second short-circuit flux (M61) of the second field magnet (60-1) circulates around the field winding (50) and the first field magnet (70-1) of the field slot (35b-1) in the clockwise direction. The flow direction of the second short-circuit flux (M61) of the second field magnet (60-2) is opposite to the flow direction of the second short-circuit flux (M61) of the second field magnet (60-1).
(Flux of Second Field Magnet: Second Interlinkage Flux)

In the first rotation control, the second interlinkage flux (M62) of the second field magnet (60-1) and the second interlinkage flux (M62) of the second field magnet (60-2) are combined. The second interlinkage flux (M62) of the second field magnets (60-1, 60-2) flows from the second field magnet (60-1), passes through the tooth (32-1), the rotor core (11), the tooth (32-3), the second field magnet (60-2), the tooth (32-4), the stator yoke (31), and the tooth (32-2) in this order, and returns to the second field magnet (60-1). As described above, the second interlinkage flux (M62) of the second field magnets (60-1, 60-2) circulates through the stator core (30) and the rotor core (11) in the counterclockwise direction.
(Advantageous Effects of First Rotation Control)

As described above, in the first rotation control, the field current (i50) is not supplied to the field winding (50). Accordingly, copper loss of the rotary electric machine (2) can be reduced.

In the first rotation control, the first interlinkage flux (M72) of the first field magnet (70) and the second interlinkage flux (M62) of the second field magnet (60) interlink with the rotor core (11). The flow direction of the first interlinkage flux (M72) is the same as the flow direction of the second interlinkage flux (M62). Thus, torque corresponding to the sum of the second interlinkage flux (M62) and the first interlinkage flux (M72) can be generated in the rotor (10).

For example, the first rotation control is suitable for low-speed and low-torque operation. In the low-speed and low-torque operation, the rotary electric machine (2) is controlled so that the rotational speed of the rotor (10) is relatively low and the rotational torque of the rotor (10) is relatively low. For example, in a case where the rotary electric machine (2) is used as a motive power source of an automobile, the low-speed and low-torque operation is performed in a scene such as city driving.

(Second Rotation Control)

Figure 6:
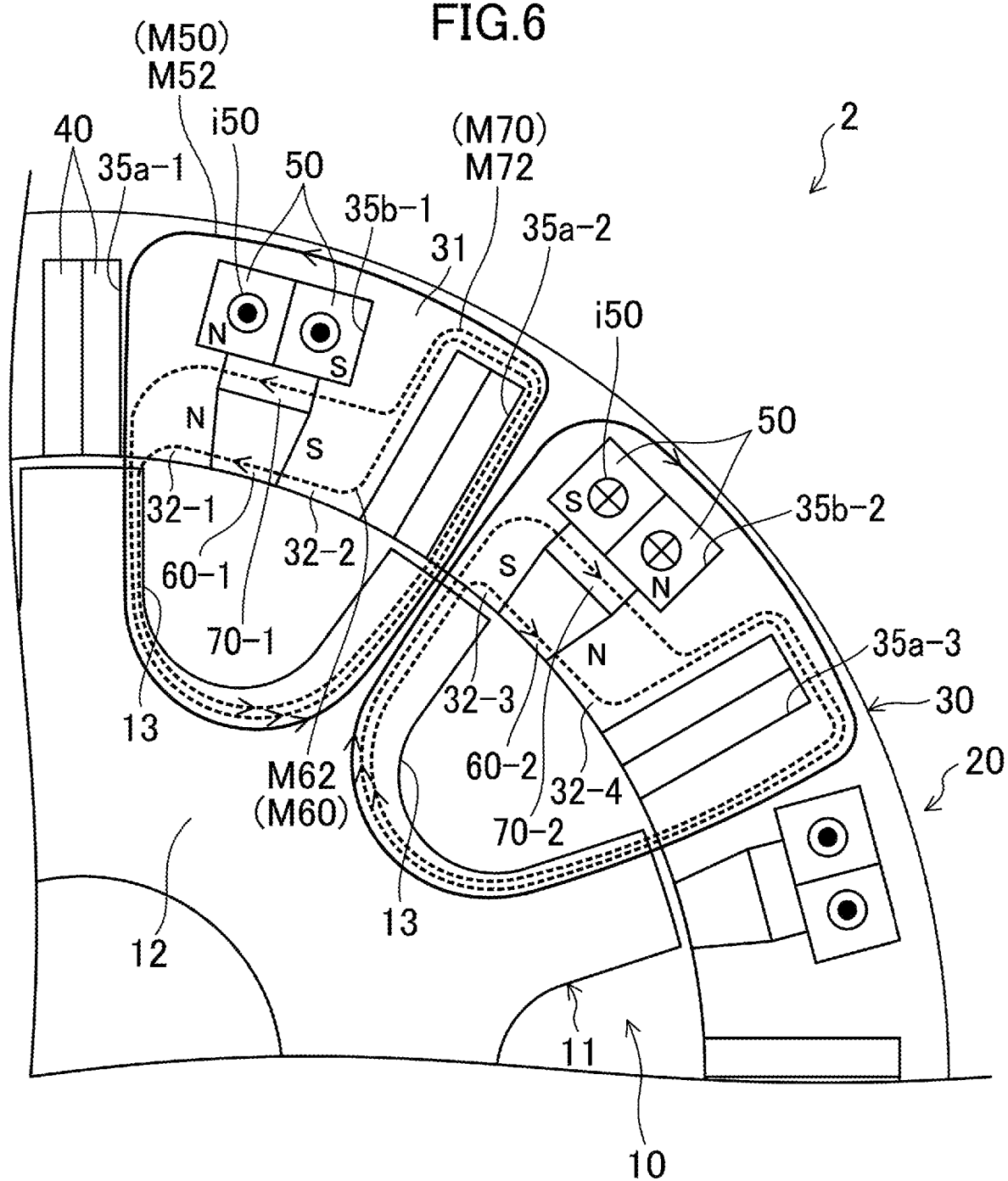
FIG. 6 is a cross-sectional view illustrating a flow of flux under second rotation control of Embodiment 1.

FIG. 6 is a view illustrating a flow of flux under the second rotation control of Embodiment 1. In the example of FIG. 6, the short-circuit flux (M51), the first short-circuit flux (M71), and the second short-circuit flux (M61) are eliminated by the magnetic field generated by the supply of the field current (i50) to the field winding (50).

In the second rotation control, the magnetization direction of the first field magnet (70) is set to the forward direction in each of the plurality of field slots (35b). Accordingly, the flow direction of the first interlinkage flux (M72) of the first field magnet (70) of the field slot (35b) is the same as the flow direction of the second interlinkage flux (M62) of the second field magnet (60) of the field slot (35b).

In the second rotation control, the control unit (3) supplies the armature current (i40) to the plurality of armature windings (40). Accordingly, the rotor (10) rotates. Also, the control unit (3) supplies the field current (i50) to the plurality of field windings (50). In each of the plurality of field slots (35b), the control unit (3) controls the field current (i50) that is supplied to the plurality of field windings (50) so that the flow direction of the interlinkage flux (M52) of the field winding (50) of the field slot (35b) is the same as the flow direction of the second interlinkage flux (M62) of the second field magnet (60) of the field slot (35b). Details of the flux under the second rotation control are as follows.

(Flux of Field Winding: Interlinkage Flux)

In the second rotation control, the interlinkage flux (M52) of the field winding (50) of the field slot (35b-1) flows from the stator yoke (31), passes through the tooth (32-1), the rotor core (11), and the tooth (32-3) in this order, and returns to the stator yoke (31). As described above, the interlinkage flux (M52) of the field winding (50) of the field slot (35b-1) circulates through the stator core (30) and the rotor core (11) in the counterclockwise direction. The flow direction of the interlinkage flux (M52) of the field winding (50) of the field slot (35b-2) is opposite to the flow direction of the interlinkage flux (M52) of the field winding (50) of the field slot (35b-1).

(Flux of First Field Magnet: First Interlinkage Flux)

In the second rotation control, the first interlinkage flux (M72) of the first field magnet (70-1) flows from the first field magnet (70-1), passes through the tooth (32-1), the rotor core (11), the tooth (32-3), the stator yoke (31), and the tooth (32-2) in this order, and returns to the first field magnet (70-1). As described above, the first interlinkage flux (M72) of the first field magnet (70-1) circulates through the stator core (30) and the rotor core (11) in the counterclockwise direction. The flow direction of the first interlinkage flux (M72) of the first field magnet (70-2) is opposite to the flow direction of the first interlinkage flux (M72) of the first field magnet (70-1).

(Flux of Second Field Magnet: Second Interlinkage Flux)

In the second rotation control, the second interlinkage flux (M62) of the second field magnet (60-1) flows from the second field magnet (60-1), passes through the tooth (32-1), the rotor core (11), the tooth (32-3), the stator yoke (31), and the tooth (32-2) in this order, and returns to the second field magnet (60-1). As described above, the second interlinkage flux (M62) of the second field magnet (60-1) circulates through the stator core (30) and the rotor core (11) in the counterclockwise direction. The flow direction of the second interlinkage flux (M62) of the second field magnet (60-2) is opposite to the flow direction of the second interlinkage flux (M62) of the second field magnet (60-1).

(Advantageous Effects of Second Rotation Control)

As described above, in the second rotation control, the interlinkage flux (M52) of the field winding (50), the first interlinkage flux (M72) of the first field magnet (70), and the second interlinkage flux (M62) of the second field magnet (60) interlink with the rotor core (11). The flow direction of the interlinkage flux (M52) is the same as the flow direction of the second interlinkage flux (M62). The flow direction of the first interlinkage flux (M72) is the same as the flow direction of the second interlinkage flux (M62). Thus, torque corresponding to the sum of the interlinkage flux (M52), the first interlinkage flux (M72), and the second interlinkage flux (M62) can be generated in the rotor (10).

Also, by controlling the field current (i50) in the second rotation control, the interlinkage flux (M52) of the field winding (50) can be controlled, and as a result, torque generated in the rotor (10) can be controlled.

For example, the second rotation control is suitable for low-speed and high-torque operation. In the low-speed and high-torque operation, the rotary electric machine (2) is controlled so that the rotational speed of the rotor (10) is relatively low and the rotational torque of the rotor (10) is relatively high. For example, in a case where the rotary electric machine (2) is used as a motive power source of an automobile, the low-speed and high-torque operation is performed in a scene such as driving on a steep slope, riding on a step, or starting.

(Third Rotation Control)

Figure 7:
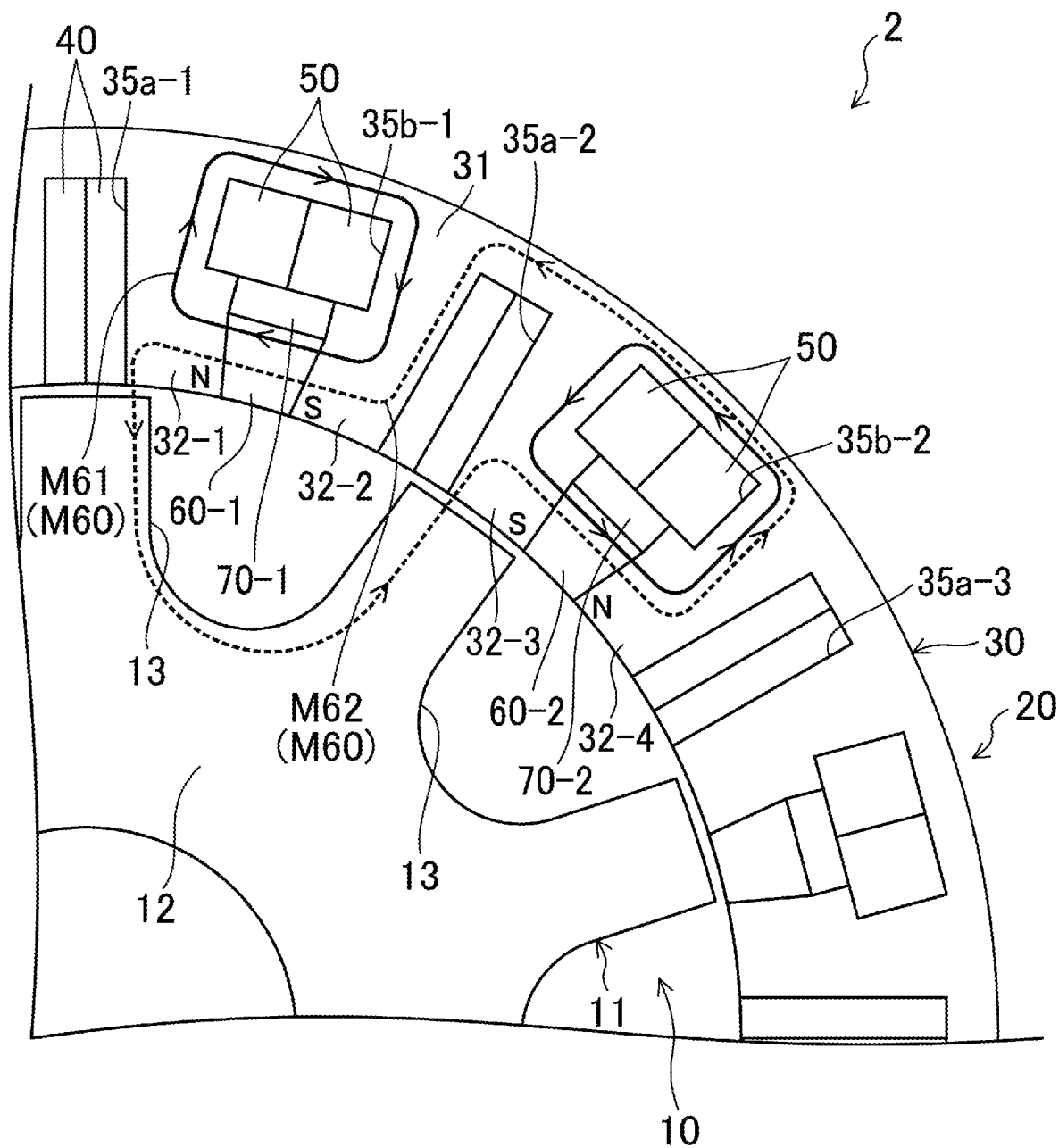
FIG. 7 is a cross-sectional view illustrating a flow of flux under third rotation control of Embodiment 1.

FIG. 7 is a view illustrating a flow of flux under the third rotation control of Embodiment 1.

In the third rotation control, the first field magnet (70) is set to the demagnetized state in each of the plurality of field slots (35b). Accordingly, in each of the plurality of field slots (35b), the magnetic force of the first field magnet (70) becomes substantially zero.

In the third rotation control, the control unit (3) supplies the armature current (i40) to the plurality of armature windings (40). Accordingly, the rotor (10) rotates. The control unit (3) does not supply the field current (i50) to the plurality of field windings (50). Details of the flux under the third rotation control are as follows.

(Flux of Second Field Magnet)

The second magnet flux (M60) (specifically, the second short-circuit flux (M61) and the second interlinkage flux (M62) under the third rotation control is similar to the second magnet flux (M60) under the first rotation control.

(Advantageous Effects of Third Rotation Control)

As described above, in the third rotation control, the field current (i50) is not supplied to the field winding (50). Accordingly, copper loss of the rotary electric machine (2) can be reduced.

In the third rotation control, the second interlinkage flux (M62) of the second field magnet (60) interlinks with the rotor core (11). Accordingly, torque corresponding to the second interlinkage flux (M62) can be generated in the rotor (10).

For example, the third rotation control is suitable for high-speed and low-torque operation. In the high-speed and low-torque operation, the rotary electric machine (2) is controlled so that the rotational speed of the rotor (10) is relatively high and the rotational torque of the rotor (10) is relatively low. For example, in a case where the rotary electric machine (2) is used as a motive power source of an automobile, the high-speed and low-torque operation is performed in a scene such as expressway driving.

(Fourth Rotation Control)

Figure 8:
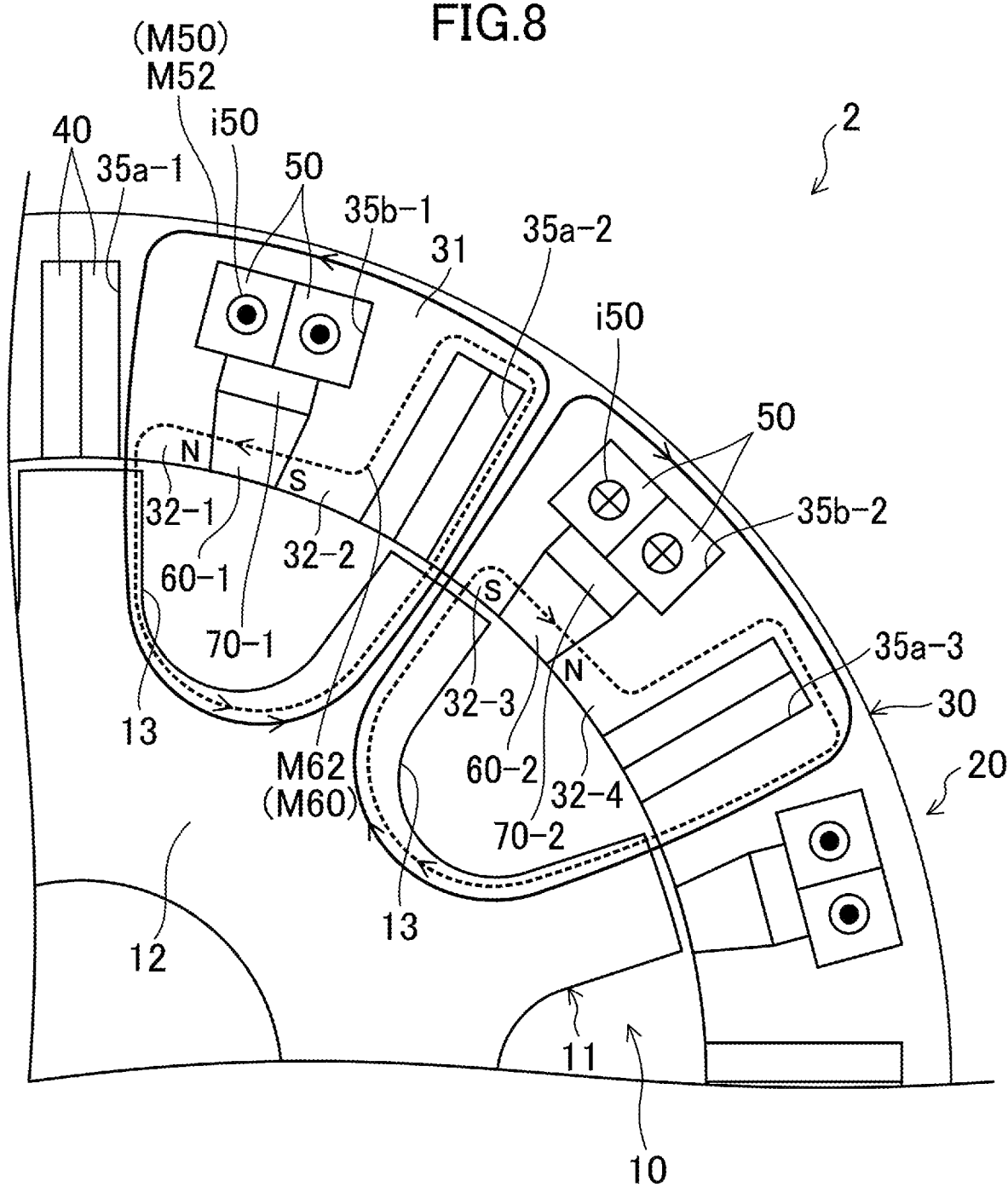
FIG. 8 is a cross-sectional view illustrating a flow of flux under fourth rotation control of Embodiment 1.

FIG. 8 is a view illustrating a flow of flux under the fourth rotation control of Embodiment 1. In the example of FIG. 8, the short-circuit flux (M51) and the second short-circuit flux (M61) are eliminated by the magnetic field generated by the supply of the field current (i50) to the field winding (50).

In the fourth rotation control, the first field magnet (70) is set to the demagnetized state in each of the plurality of field slots (35*b*). Accordingly, in each of the plurality of field slots (35*b*), the magnetic force of the first field magnet (70) becomes substantially zero.

In the fourth rotation control, the control unit (3) supplies the armature current (i40) to the plurality of armature windings (40). Accordingly, the rotor (10) rotates. Also, the control unit (3) supplies the field current (i50) to the plurality of field windings (50). In each of the plurality of field slots (35*b*), the control unit (3) controls the field current (i50) that is supplied to the plurality of field windings (50) so that the flow direction of the interlinkage flux (M52) of the field winding (50) of the field slot (35*b*) is the same as the flow direction of the second interlinkage flux (M62) of the second field magnet (60) of the field slot (35*b*). Details of the flux under the fourth rotation control are as follows.

(Flux of Field Winding)

The field flux (M50) (specifically, the interlinkage flux (M52) under the fourth rotation control is similar to the field flux (M50) under the second rotation control.

(Flux of Second Field Magnet)

The second magnet flux (M60) (specifically, the second interlinkage flux (M62) under the fourth rotation control is similar to the second magnet flux (M60) under the third rotation control.

(Advantageous Effects of Fourth Rotation Control)

As described above, in the fourth rotation control, the interlinkage flux (M52) of the field winding (50) and the second interlinkage flux (M62) of the second field magnet (60) interlink with the rotor core (11). The flow direction of the interlinkage flux (M52) is the same as the flow direction of the second interlinkage flux (M62). Thus, torque corresponding to the sum of the interlinkage flux (M52) and the second interlinkage flux (M62) can be generated in the rotor (10).

Also, by controlling the field current (i50) in the fourth rotation control, the interlinkage flux (M52) of the field winding (50) can be controlled, and as a result, the torque generated in the rotor (10) can be controlled.

For example, the fourth rotation control is suitable for low-speed and high-torque operation.

(Fifth Rotation Control)

Figure 9:
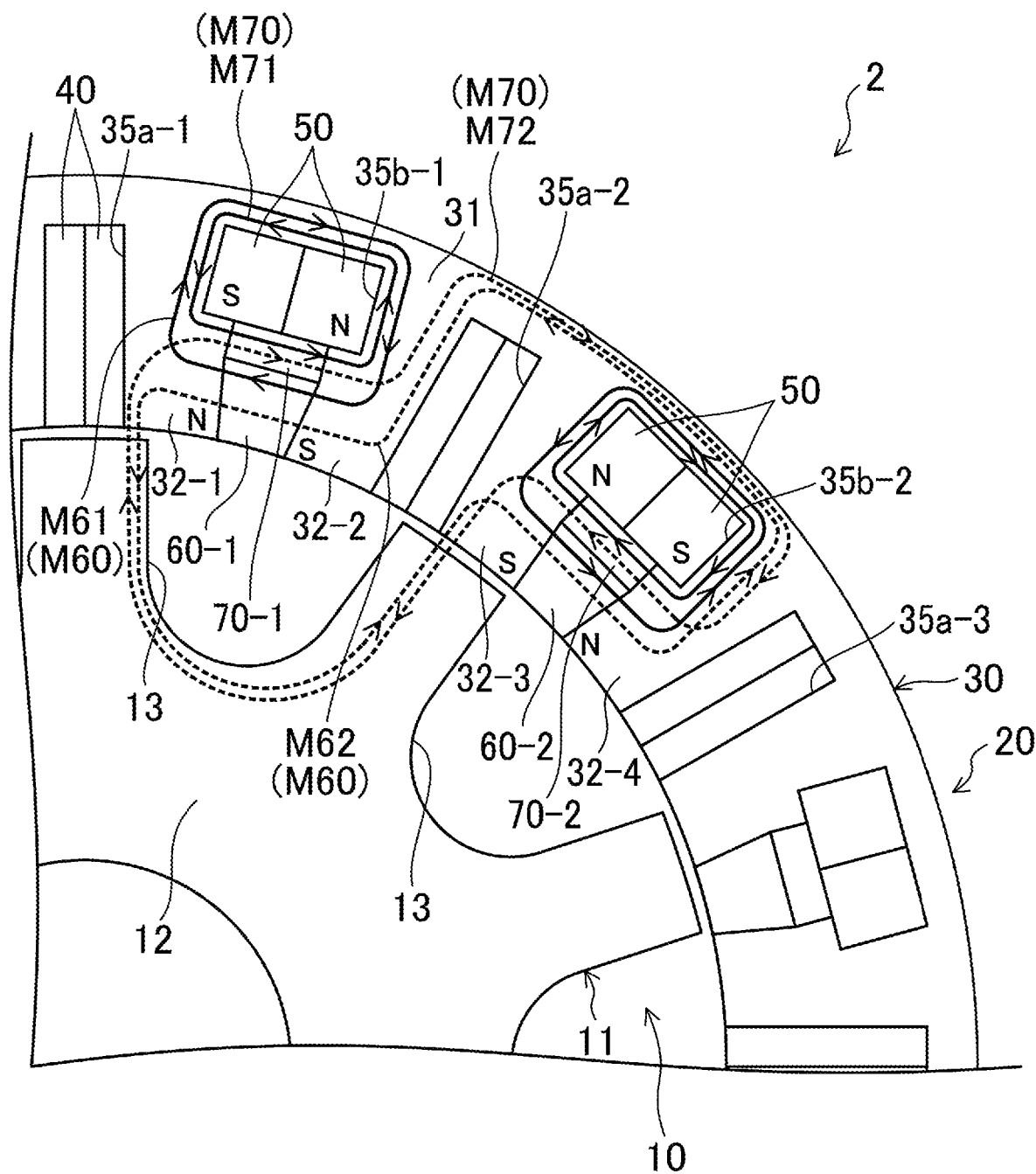
FIG. 9 is a cross-sectional view illustrating a flow of flux under fifth rotation control of Embodiment 1.

FIG. 9 is a view illustrating a flow of flux under the fifth rotation control of Embodiment 1.

In the fifth rotation control, the magnetization direction of the first field magnet (70) is set to the reverse direction in each of the plurality of field slots (35*b*). Accordingly, the flow direction of the first interlinkage flux (M72) of the first field magnet (70) of the field slot (35*b*) is opposite to the flow direction of the second interlinkage flux (M62) of the second field magnet (60) of the field slot (35*b*).

In the fifth rotation control, the control unit (3) supplies the armature current (i40) to the plurality of armature windings (40). Accordingly, the rotor (10) rotates. The control unit (3) does not supply the field current (i50) to the plurality of field windings (50). Details of the flux under the fifth rotation control are as follows.

(Flux of First Field Magnet: First Short-Circuit Flux)

The flow direction of the first short-circuit flux (M71) under the fifth rotation control is opposite to the flow direction of the first short-circuit flux (M71) under the first rotation control. Specifically, in the fifth rotation control, the first short-circuit flux (M71) of the first field magnet (70-1) flows from the first field magnet (70-1), passes through the tooth (32-1), the stator yoke (31), and the tooth (32-2) in this order, and returns to the first field magnet (70-1). As described above, the first short-circuit flux (M71) of the first field magnet (70-1) circulates around the field winding (50) of the field slot (35*b*-1) in the counterclockwise direction. The flow direction of the first short-circuit flux (M71) of the first field magnet (70-2) is opposite to the flow direction of the first short-circuit flux (M71) of the first field magnet (70-1).

(Flux of First Field Magnet: First Interlinkage Flux)

The flow direction of the first interlinkage flux (M72) under the fifth rotation control is opposite to the flow direction of the first interlinkage flux (M72) under the first rotation control. Specifically, in the fifth rotation control, the first interlinkage flux (M72) of the first field magnet (70-1) and the first interlinkage flux (M72) of the first field magnet (70-2) are combined. The first interlinkage flux (M72) of the first field magnets (70-1, 70-2) flows from the first field magnet (70-1), passes through the tooth (32-2), the stator yoke (31), the tooth (32-4), the first field magnet (70-2), the tooth (32-3), the rotor core (11), and the tooth (32-1) in this order, and returns to the first field magnet (70-1). As described above, the first interlinkage flux (M72) of the first field magnets (70-1, 70-2) circulates through the stator core (30) and the rotor core (11) in the clockwise direction.

(Flux of Second Field Magnet)

The second magnet flux (M60) (specifically, the second short-circuit flux (M61) and the second interlinkage flux (M62) under the fifth rotation control is similar to the second magnet flux (M60) under the first rotation control.

(Advantageous Effects of Fifth Rotation Control)

As described above, in the fifth rotation control, the field current (i50) is not supplied to the field winding (50). Accordingly, copper loss of the rotary electric machine (2) can be reduced.

In the fifth rotation control, the first interlinkage flux (M72) of the first field magnet (70) and the second interlinkage flux (M62) of the second field magnet (60) interlink with the rotor core (11). The flow direction of the first interlinkage flux (M72) is opposite to the flow direction of the second interlinkage flux (M62). Thus, torque corresponding to the difference between the first interlinkage flux (M72) and the second interlinkage flux (M62) can be generated in the rotor (10).

For example, the fifth rotation control is suitable for high-speed and low-torque operation.

(Sixth Rotation Control)

Figure 10:
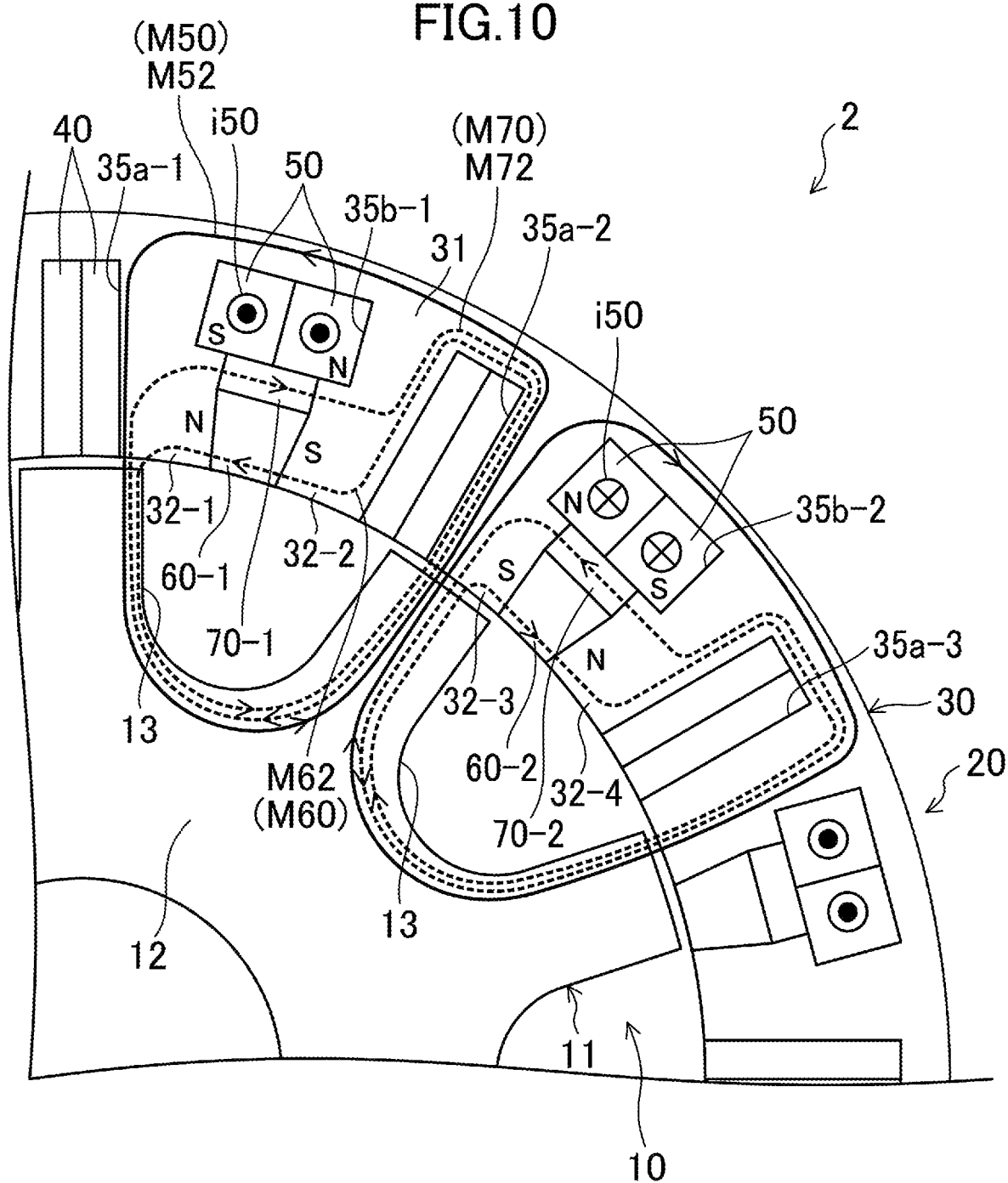
FIG. 10 is a cross-sectional view illustrating a flow of flux under sixth rotation control of Embodiment 1.

FIG. 10 is a view illustrating a flow of flux under the sixth rotation control of Embodiment 1. In the example of FIG. 10, the short-circuit flux (M51), the first short-circuit flux (M71), and the second short-circuit flux (M61) are eliminated by the magnetic field generated by the supply of the field current (i50) to the field winding (50).

In the sixth rotation control, the magnetization direction of the first field magnet (70) is set to the reverse direction in each of the plurality of field slots (35*b*). Accordingly, the flow direction of the first interlinkage flux (M72) of the first field magnet (70) of the field slot (35*b*) is opposite to the flow direction of the second interlinkage flux (M62) of the second field magnet (60) of the field slot (35*b*).

In the sixth rotation control, the control unit (3) supplies the armature current (i40) to the plurality of armature windings (40). Accordingly, the rotor (10) rotates. Also, the control unit (3) supplies the field current (i50) to the plurality of field windings (50). In each of the plurality of field slots (35b), the control unit (3) controls the field current (i50) that is supplied to the plurality of field windings (50) so that the flow direction of the interlinkage flux (M52) of the field winding (50) of the field slot (35b) is the same as the flow direction of the second interlinkage flux (M62) of the second field magnet (60) of the field slot (35b). Details of the flux under the sixth rotation control are as follows.

(Flux of Field Winding)

The field flux (M50) (specifically, the interlinkage flux (M52) under the sixth rotation control is similar to the field flux (M50) under the second rotation control.

(Flux of First Field Magnet: First Interlinkage Flux)

The flow direction of the first interlinkage flux (M72) under the sixth rotation control is opposite to the flow direction of the first interlinkage flux (M72) under the second rotation control. Specifically, in the sixth rotation control, the first interlinkage flux (M72) of the first field magnet (70-1) flows from the first field magnet (70-1), passes through the tooth (32-2), the stator yoke (31), the tooth (32-3), the rotor core (11), and the tooth (32-1) in this order, and returns to the first field magnet (70-1). As described above, the first interlinkage flux (M72) of the first field magnet (70-1) circulates through the stator core (30) and the rotor core (11) in the clockwise direction. The flow direction of the first interlinkage flux (M72) of the first field magnet (70-2) is opposite to the flow direction of the first interlinkage flux (M72) of the first field magnet (70-1).

(Flux of Second Field Magnet)

The second magnet flux (M60) (specifically, the second interlinkage flux (M62) under the sixth rotation control is similar to the second magnet flux (M60) under the fifth rotation control.

(Advantageous Effects of Sixth Rotation Control)

As described above, in the sixth rotation control, the interlinkage flux (M52) of the field winding (50), the first interlinkage flux (M72) of the first field magnet (70), and the second interlinkage flux (M62) of the second field magnet (60) interlink with the rotor core (11). The flow direction of the interlinkage flux (M52) is the same as the flow direction of the second interlinkage flux (M62). The flow direction of the first interlinkage flux (M72) is opposite to the flow direction of the second interlinkage flux (M62). Thus, torque corresponding to the difference between "the sum of the interlinkage flux (M52) and the second interlinkage flux (M62)" and "the first interlinkage flux (M72)" can be generated in the rotor (10).

Also, by controlling the field current (i50) in the sixth rotation control, the interlinkage flux (M52) of the field winding (50) can be controlled, and as a result, the torque generated in the rotor (10) can be controlled.

For example, the sixth rotation control is suitable for low-speed and high-torque operation. For example, the sixth rotation control may be omitted. The same applies to other control.

(Advantageous Effects of Embodiment 1)

As described above, in a rotary electric machine apparatus (1) of Embodiment 1, a rotary electric machine (2) includes a rotor (10) and a stator (20). The stator (20) has a stator core (30), an armature winding (40), a field winding (50), a first field magnet (70), and a second field magnet (60). The stator core (30) is provided with an armature slot (35a) and a field slot (35b) alternately arranged in a circumferential direction. An armature winding (40) is housed in the armature slot (35a). The field winding (50), the first field magnet (70), and the second field magnet (60) are housed in the field slot (35b). The armature winding (40) generates a rotating magnetic field for rotating the rotor (10) by being supplied with an alternating-current armature current (i40). The field winding (50) generates a field flux (M50) by being supplied with a direct-current field current (i50). The second field magnet (60) has pole faces facing in the circumferential direction. The first field magnet (70) is disposed magnetically in parallel with the second field magnet (60), and can change a magnetic force by the field flux (M50).

With the above-described configuration, the magnitude and direction of the magnetic force of the first field magnet (70) can be changed by the field flux (M50). Accordingly, for example, it is possible to switch among a first magnetized state in which the direction of the magnetic force of the first field magnet (70) is a forward direction, a demagnetized state in which the magnetic force of the first field magnet (70) is substantially zero, and a second magnetized state in which the direction of the magnetic force of the first field magnet (70) is a reverse direction. Also, it is possible to switch between an energized state in which the field winding (50) is supplied with the field current (i50) and a non-energized state in which the field winding (50) is not supplied with the field current (i50). Accordingly, the six operating modes can be provided, and hence the control of the rotary electric machine (2) can be diversified.

In the rotary electric machine apparatus (1) of Embodiment 1, the stator (20) has a second field magnet (60) housed in the field slot (35b).

With the above-described configuration, even when the magnetic force of the first field magnet (70) is substantially zero, the second field magnet (60) can provide a magnet flux (M60) in a constant direction.

In the rotary electric machine apparatus (1) of Embodiment 1, in an operating temperature range of the rotary electric machine (2), a maximum value of a coercive force of the first field magnet (70) is smaller than a minimum value of a coercive force of the second field magnet (60).

With the above-described configuration, the second field magnet (60) can be configured so that a change in magnetic force of the second field magnet (60) by the field flux (M50) of the field winding (50) is not generated as much as possible. Accordingly, it is possible to appropriately switch among the first magnetized state, the demagnetized state, and the second magnetized state, and the rotary electric machine (2) can be appropriately controlled.

In the rotary electric machine apparatus (1) of Embodiment 1, the first field magnet (70) is disposed radially outward of the second field magnet (60) in the field slot (35b).

With the above-described configuration, the second field magnet (60) can be brought closer to the rotor (10) than in a case where the second field magnet (60) is disposed radially outward of the first field magnet (70) in the field slot (35b). Accordingly, it is easy for the flux of the second field magnet (60) to interlink with the rotor (10), so that the flux of the second field magnet (60) can be effectively used.

In the rotary electric machine apparatus (1) of Embodiment 1, the field winding (50) is disposed radially outward of the first field magnet (70) in the field slot (35b).

With the above-described configuration, the first field magnet (70) can be brought closer to the field winding (50) than in a case where the second field magnet (60) is interposed between the field winding (50) and the first field magnet (70) in the field slot (35b). Accordingly, since the field flux (M50) of the field winding (50) can be efficiently passed through the first field magnet (70), the magnetic force of the first field magnet (70) can be easily changed by the field flux (M50). Also, since the first field magnet (70) is located radially inward of the second field magnet (60) when viewed from the field winding (50), the field flux (M50) of the field winding (50) passes through the first field magnet (70) more preferentially than the second field magnet (60) when the first field magnet (70) is magnetized or demagnetized. Accordingly, it is easy to magnetize or demagnetize the first field magnet (70). Also, positioning of the rotor (10) is not required.

In the rotary electric machine apparatus (1) of Embodiment 1, a circumferential length (LC70) of the first field magnet (70) is equal to or smaller than a circumferential length (LC60) of a portion on a radially outer side of the second field magnet (60), and equal to or smaller than a circumferential length (LC350) of a portion on a radially inner side of a winding housing portion (350) of the field slot (35b).

With the above-described configuration, when the first field magnet (70) is viewed from the rotor (10) side, an end portion in the circumferential direction of the first field magnet (70) can be prevented from protruding from the second field magnet (60).

Accordingly, it is possible to suppress generation of a fringing flux at the end portion in the circumferential direction of the first field magnet (70), thereby reducing demagnetization of the first field magnet (70) due to the fringing flux. As described above, the flux of the first field magnet (70) can be effectively used in a case of operation with a constant magnetic force.

Embodiment 2

FIG. 11 is a view illustrating a configuration of a rotary electric machine apparatus (1) of Embodiment 2. The rotary electric machine apparatus (1) of Embodiment 2 differs from the rotary electric machine apparatus (1) of Embodiment 1 in the configuration in the field slot (35b) of the stator (20) of the rotary electric machine (2). Other configurations of the rotary electric machine apparatus (1) of Embodiment 2 are similar to the configurations of the rotary electric machine apparatus (1) of Embodiment 1.

(Configuration in Field Slot)

Figure 12:
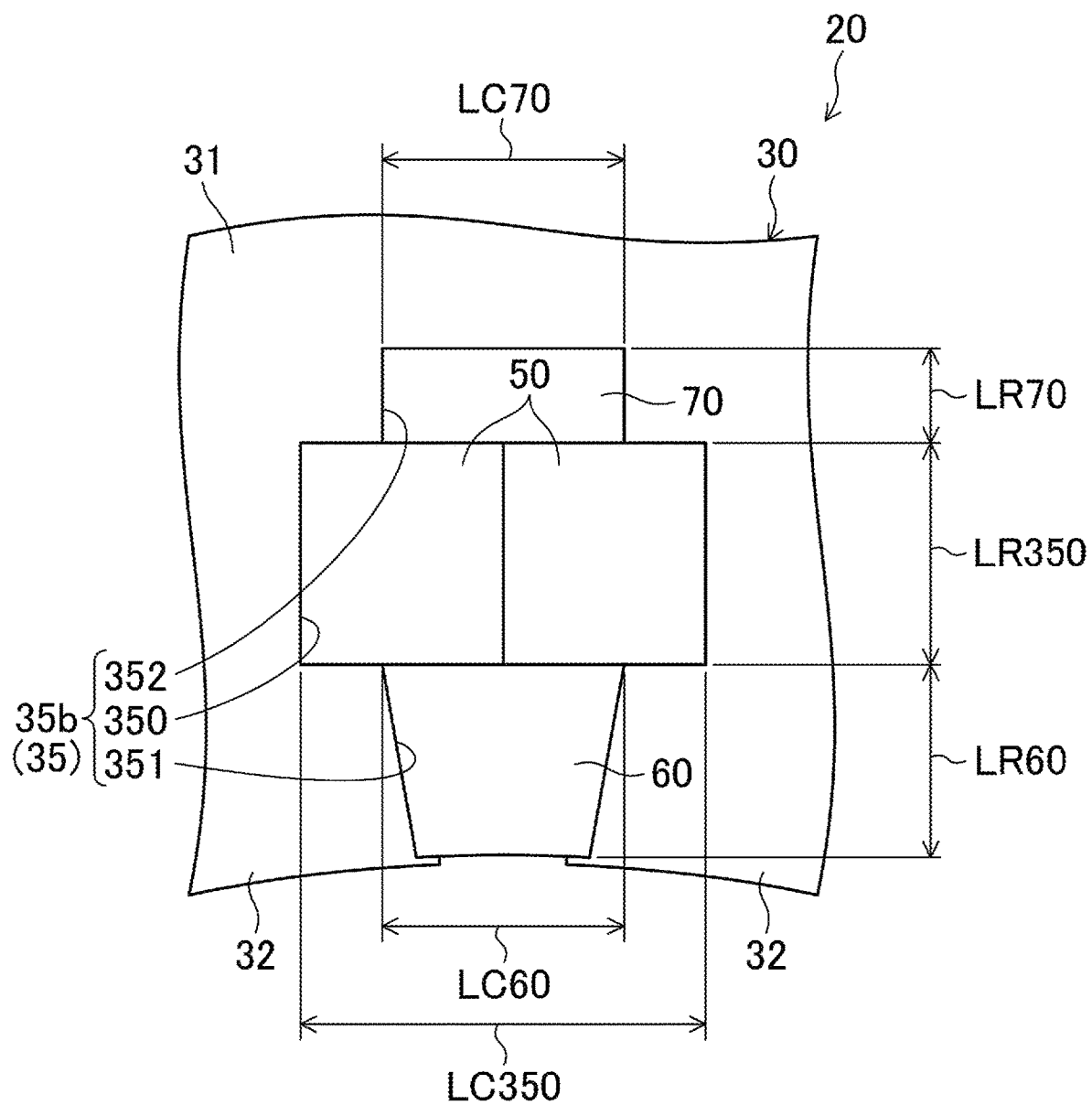
FIG. 12 is a cross-sectional view illustrating a configuration of a main part of the rotary electric machine of Embodiment 2.

FIG. 12 is a view illustrating the configuration in the field slot (35b) in Embodiment 2. In the configuration in the field slot (35b) of Embodiment 2, disposition of the field winding (50) and the first field magnet (70) is different from the configuration in the field slot (35b) of Embodiment 1. Other configurations in the field slot (35b) of Embodiment 2 are similar to the configurations in the field slot (35b) of Embodiment 1.

In Embodiment 2, the winding housing portion (350) is disposed radially outward of the second magnet housing portion (351), and the first magnet housing portion (352) is disposed radially outward of the winding housing portion (350). With such a configuration, in Embodiment 2, the field winding (50) is disposed radially outward of the second field magnet (60) in the field slot (35b), and the first field magnet (70) is disposed radially outward of the field winding (50) in the field slot (35b).

In Embodiment 2, the circumferential length (LC70) of the first field magnet (70) is equal to or smaller than the circumferential length (LC350) of the portion on the radially outer side of the winding housing portion (350) of the field slot (35b).

In the example illustrated in FIG. 12, the winding housing portion (350) communicates with the second magnet housing portion (351), and the first magnet housing portion (352) communicates with the winding housing portion (350). The field winding (50) is adjacent to the radially outer side of the second field magnet (60), and the first field magnet (70) is adjacent to the radially outer side of the field winding (50). The circumferential length (LC70) of the first field magnet (70) is equal to the circumferential length (LC60) of the portion on the radially outer side of the second field magnet (60), and is shorter than the circumferential length (LC350) of the portion on the radially inner side of the winding housing portion (350). The radial length (LR70) of the first field magnet (70) is shorter than the circumferential length (LC70) of the first field magnet (70). The radial length (LR70) of the first field magnet (70) is shorter than a radial length (LR60) of the second field magnet (60) and the radial length (LR350) of the winding housing portion (350).

(Operation of Control Unit)

Similarly to the control unit (3) of the Embodiment 1, the control unit (3) of Embodiment 2 selectively performs first magnetic force control, second magnetic force control, first rotation control, second rotation control, third rotation control, fourth rotation control, fifth rotation control, and sixth rotation control.

(First Magnetic Force Control)

Figure 13:
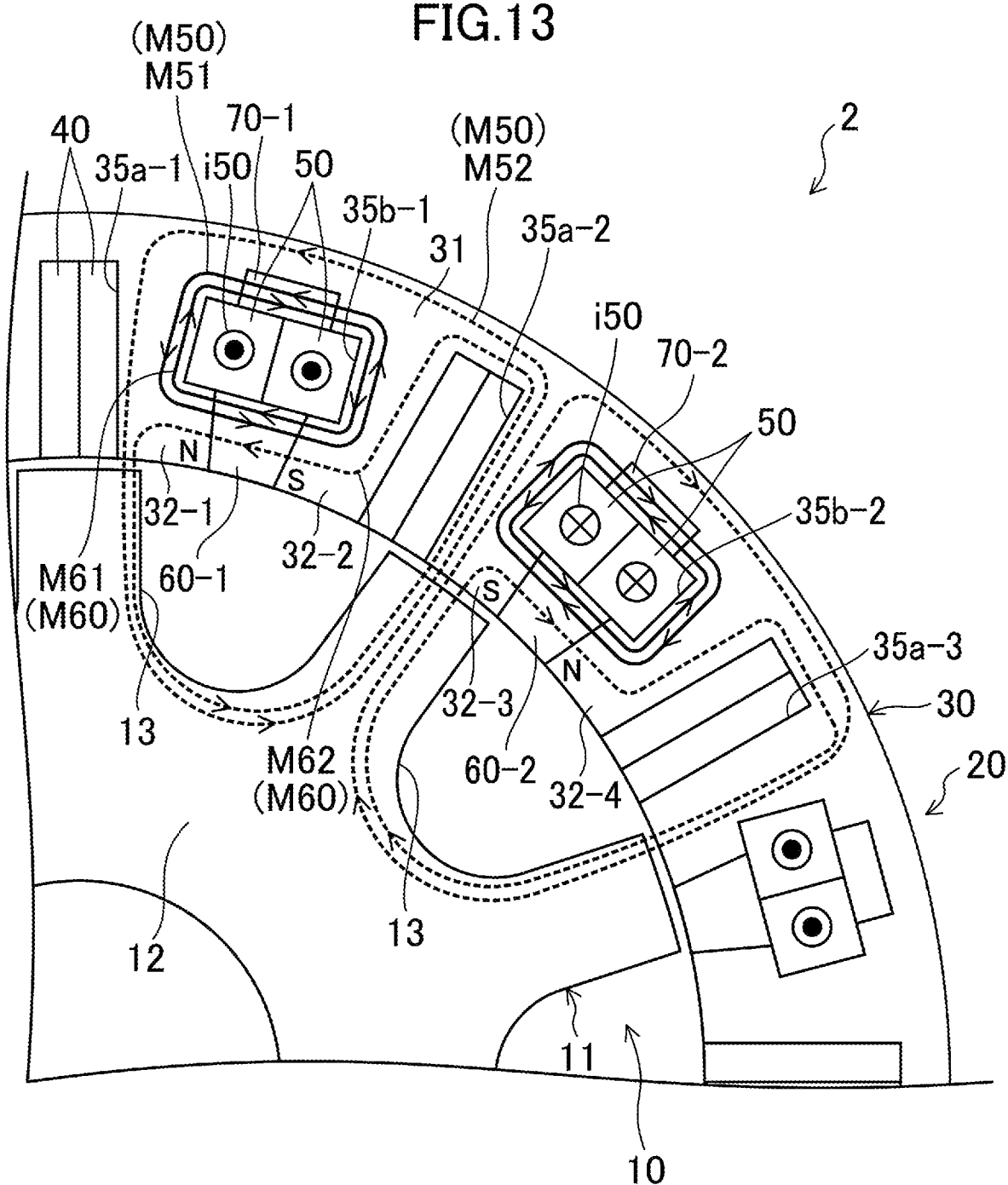
FIG. 13 is a cross-sectional view illustrating a flow of flux under first magnetic force control of Embodiment 2.

FIG. 13 is a view illustrating a flow of flux under the first magnetic force control of Embodiment 2.

The operation of the control unit (3) in the first magnetic force control of Embodiment 2 is similar to the operation of the control unit (3) in the first magnetic force control of Embodiment 1. Details of the flux under the first magnetic force control of Embodiment 2 are as follows.

(Flux of Field Winding: Short-Circuit Flux)

In the first magnetic force control, the short-circuit flux (M51) of the field winding (50) of the field slot (35b-1) flows from the second field magnet (60-1), passes through the tooth (32-2), the first field magnet (70-1), and the tooth (32-1) in this order, and returns to the second field magnet (60-1). As described above, the short-circuit flux (M51) of the field winding (50) of the field slot (35b-1) circulates around the field winding (50) of the field slot (35b-1) in the counterclockwise direction. The flow direction of the short-circuit flux (M51) of the field winding (50) of the field slot (35b-2) is opposite to the flow direction of the short-circuit flux (M51) of the field winding (50) of the field slot (35b-1).

(Flux of Field Winding: Interlinkage Flux)

In the first magnetic force control, the interlinkage flux (M52) of the field winding (50) of the field slot (35b-1) flows from the stator yoke (31), passes through the tooth (32-1), the rotor core (11), and the tooth (32-3) in this order, and returns to the stator yoke (31). As described above, the interlinkage flux (M52) of the field winding (50) of the field slot (35b-1) circulates through the stator core (30) and the rotor core (11) in the counterclockwise direction. The flow direction of the interlinkage flux (M52) of the field winding (50) of the field slot (35b-2) is opposite to the flow direction of the interlinkage flux (M52) of the field winding (50) of the field slot (35b-1).

(Flux of Second Field Magnet: Second Short-Circuit Flux)

In the first magnetic force control, the second short-circuit flux (M61) of the second field magnet (60-1) flows from the second field magnet (60-1), passes through the tooth (32-1), the first field magnet (70-1), and the tooth (32-2) in this order, and returns to the second field magnet (60-1). As described above, the second short-circuit flux (M61) of the second field magnet (60-1) circulates around the field winding (50) of the field slot (35b-1) in the clockwise direction. The flow direction of the second short-circuit flux (M61) of the second field magnet (60-2) is opposite to the flow direction of the second short-circuit flux (M61) of the second field magnet (60-1).

(Flux of Second Field Magnet: Second Interlinkage Flux)

In the first magnetic force control, the second interlinkage flux (M62) of the second field magnet (60-1) flows from the second field magnet (60-1), passes through the tooth (32-1), the rotor core (11), the tooth (32-3), the stator yoke (31), and the tooth (32-2) in this order, and returns to the second field magnet (60-1). As described above, the second interlinkage flux (M62) of the second field magnet (60-1) circulates through the stator core (30) and the rotor core (11) in the counterclockwise direction. The flow direction of the second interlinkage flux (M62) of the second field magnet (60-2) is opposite to the flow direction of the second interlinkage flux (M62) of the second field magnet (60-1).

(Advantageous Effects of First Magnetic Force Control)

In the first magnetic force control of Embodiment 2, it is possible to obtain advantageous effects similar to the advantageous effects of the first magnetic force control of Embodiment 1.

(Second Magnetic Force Control)

Figure 14:
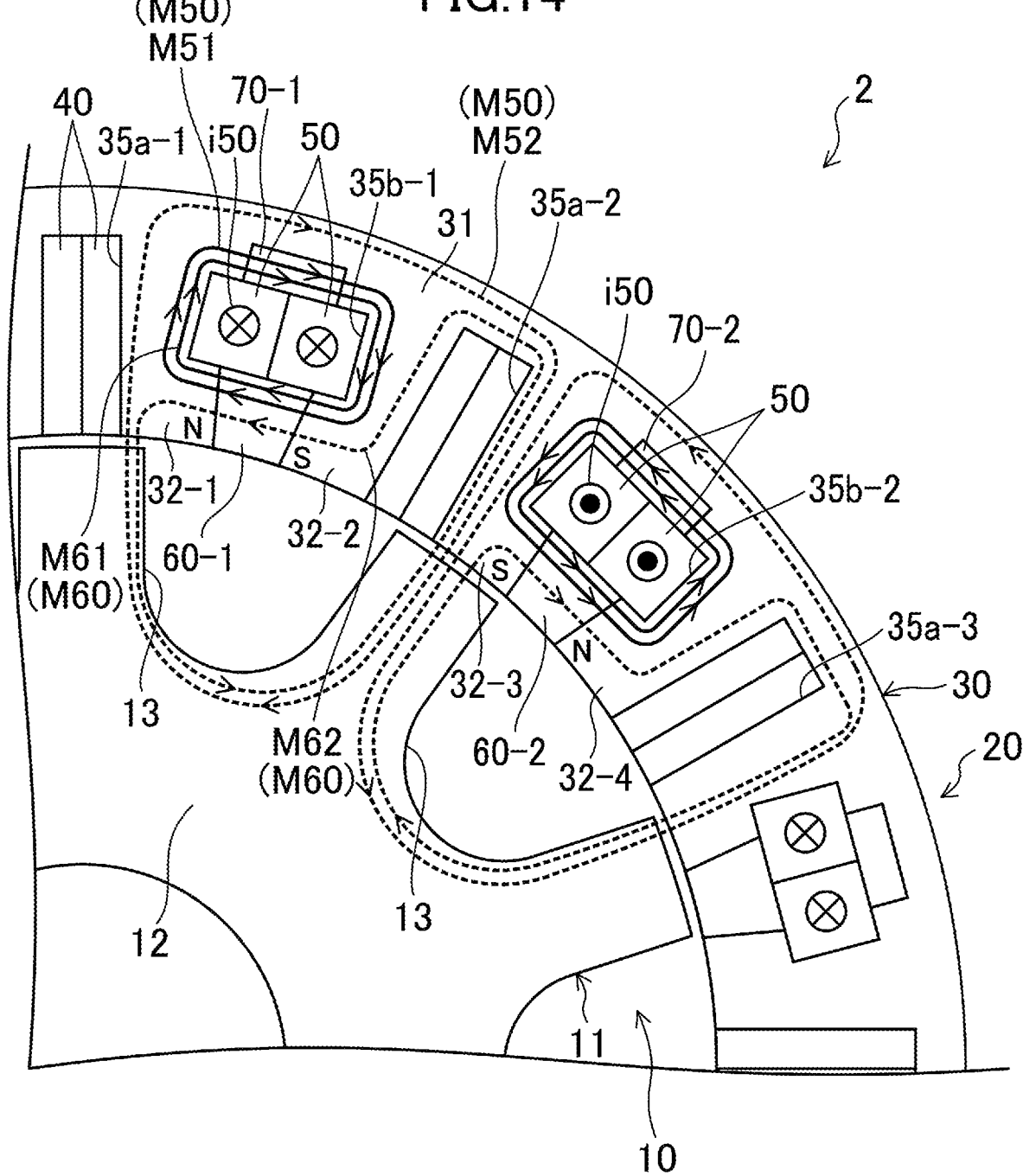
FIG. 14 is a cross-sectional view illustrating a flow of flux under second magnetic force control of Embodiment 2.

FIG. 14 is a view illustrating a flow of flux under the second magnetic force control of Embodiment 2.

The operation of the control unit (3) in the second magnetic force control of Embodiment 2 is similar to the operation of the control unit (3) in the second magnetic force control of Embodiment 1. Details of the flux under the second magnetic force control of Embodiment 2 are as follows.

(Flux of Field Winding: Short-Circuit Flux)

The flow direction of the short-circuit flux (M51) under the second magnetic force control is opposite to the flow direction of the short-circuit flux (M51) under the first magnetic force control. Specifically, in the second magnetic force control, the short-circuit flux (M51) of the field winding (50) of the field slot (35b-1) flows from the second field magnet (60-1), passes through the tooth (32-1), the first field magnet (70-1), and the tooth (32-2) in this order, and returns to the second field magnet (60-1). As described above, the short-circuit flux (M51) of the field winding (50) of the field slot (35b-1) circulates around the field winding (50) of the field slot (35b-1) in the clockwise direction. The flow direction of the short-circuit flux (M51) of the field winding (50) of the field slot (35b-2) is opposite to the flow direction of the short-circuit flux (M51) of the field winding (50) of the field slot (35b-1).

(Flux of Field Winding: Interlinkage Flux)

The flow direction of the interlinkage flux (M52) under the second magnetic force control is opposite to the flow direction of the interlinkage flux (M52) under the first magnetic force control. Specifically, in the second magnetic force control, the interlinkage flux (M52) of the field winding (50) of the field slot (35b-1) flows from the stator yoke (31), passes through the tooth (32-3), the rotor core (11), and the tooth (32-1) in this order, and returns to the stator yoke (31). As described above, the interlinkage flux (M52) of the field winding (50) of the field slot (35b-1) circulates through the stator core (30) and the rotor core (11) in the clockwise direction. The flow direction of the interlinkage flux (M52) of the field winding (50) of the field slot (35b-2) is opposite to the flow direction of the interlinkage flux (M52) of the field winding (50) of the field slot (35b-1).

(Flux of Second Field Magnet)

The second magnet flux (M60) (specifically, the second short-circuit flux (M61) and the second interlinkage flux (M62) under the second magnetic force control is similar to the second magnet flux (M60) under the first magnetic force control.

(Advantageous Effects of Second Magnetic Force Control)

In the second magnetic force control of Embodiment 2, it is possible to obtain advantageous effects similar to the advantageous effects of the second magnetic force control of Embodiment 1.

(First Rotation Control)

Figure 15:
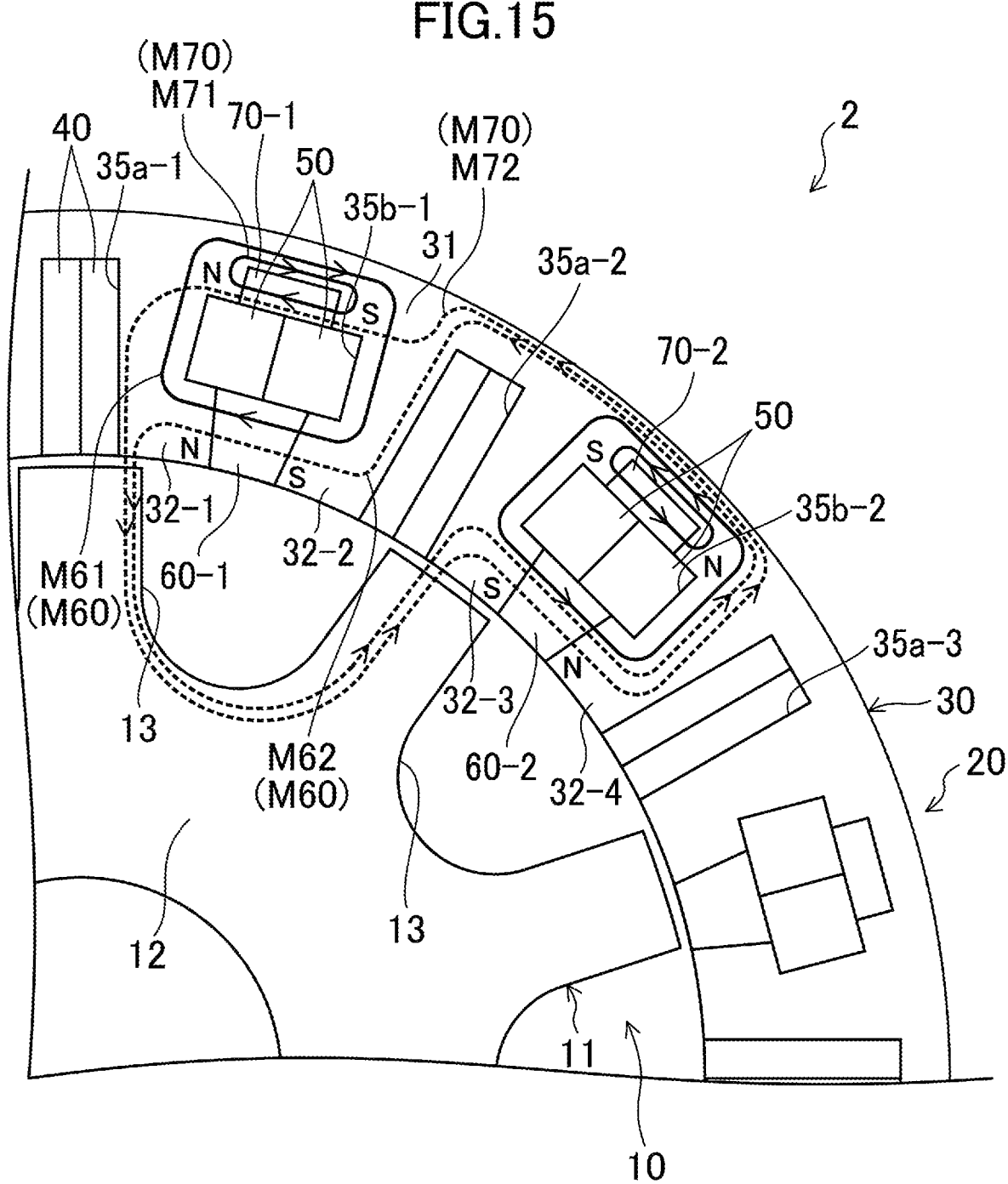
FIG. 15 is a cross-sectional view illustrating a flow of flux under first rotation control of Embodiment 2.

FIG. 15 is a view illustrating a flow of flux under the first rotation control of Embodiment 2.

In the first rotation control, the magnetization direction of the first field magnet (70) is set to the forward direction. The operation of the control unit (3) in the first rotation control of Embodiment 2 is similar to the operation of the control unit (3) in the first rotation control of Embodiment 1. Details of the flux under the first rotation control of Embodiment 2 are as follows.

(Flux of First Field Magnet: First Short-Circuit Flux)

In the first rotation control, the first short-circuit flux (M71) of the first field magnet (70-1) flows from the first field magnet (70-1), passes through the tooth (32-1), the stator yoke (31), and the tooth (32-2) in this order, and returns to the first field magnet (70-1). As described above, the first short-circuit flux (M71) of the first field magnet (70-1) circulates through the first field magnet (70-1) and the stator yoke (31) in the clockwise direction. The flow direction of the first short-circuit flux (M71) of the first field magnet (70-2) is opposite to the flow direction of the first short-circuit flux (M71) of the first field magnet (70-1).

(Flux of First Field Magnet: First Interlinkage Flux)

In the first rotation control, the first interlinkage flux (M72) of the first field magnet (70-1) and the first interlinkage flux (M72) of the first field magnet (70-2) are combined. The first interlinkage flux (M72) of the first field magnets (70-1, 70-2) flows from the first field magnet (70-1), passes through the tooth (32-1), the rotor core (11), the tooth (32-3), the second field magnet (60-2), the tooth (32-4), the stator yoke (31), and the tooth (32-2) in this order, and returns to the first field magnet (70-1). As described above, the first interlinkage flux (M72) of the first field magnets (70-1, 70-2) circulates through the stator core (30) and the rotor core (11) in the counterclockwise direction.

(Flux of Second Field Magnet: Second Short-Circuit Flux)

In the first rotation control, the second short-circuit flux (M61) of the second field magnet (60-1) flows from the second field magnet (60-1), passes through the tooth (32-1), the first field magnet (70-1), and the tooth (32-2) in this order, and returns to the second field magnet (60-1). As described above, the second short-circuit flux (M61) of the second field magnet (60-1) circulates around the field winding (50) of the field slot (35b-1) in the clockwise direction. The flow direction of the second short-circuit flux (M61) of the second field magnet (60-2) is opposite to the flow direction of the second short-circuit flux (M61) of the second field magnet (60-1).

(Flux of Second Field Magnet: Second Interlinkage Flux)

In the first rotation control, the second interlinkage flux (M62) of the second field magnet (60-1) and the second interlinkage flux (M62) of the second field magnet (60-2) are combined. The second interlinkage flux (M62) of the second field magnets (60-1, 60-2) flows from the second field magnet (60-1), passes through the tooth (32-1), the rotor core (11), the tooth (32-3), the second field magnet (60-2), the tooth (32-4), the stator yoke (31), and the tooth (32-2) in this order, and returns to the second field magnet (60-1). As described above, the second interlinkage flux (M62) of the second field magnets (60-1, 60-2) circulates through the stator core (30) and the rotor core (11) in the counterclockwise direction.

(Advantageous Effects of First Rotation Control)

In the first rotation control of Embodiment 2, it is possible to obtain advantageous effects similar to the advantageous effects of the first rotation control of Embodiment 1.

(Second Rotation Control)

Figure 16:
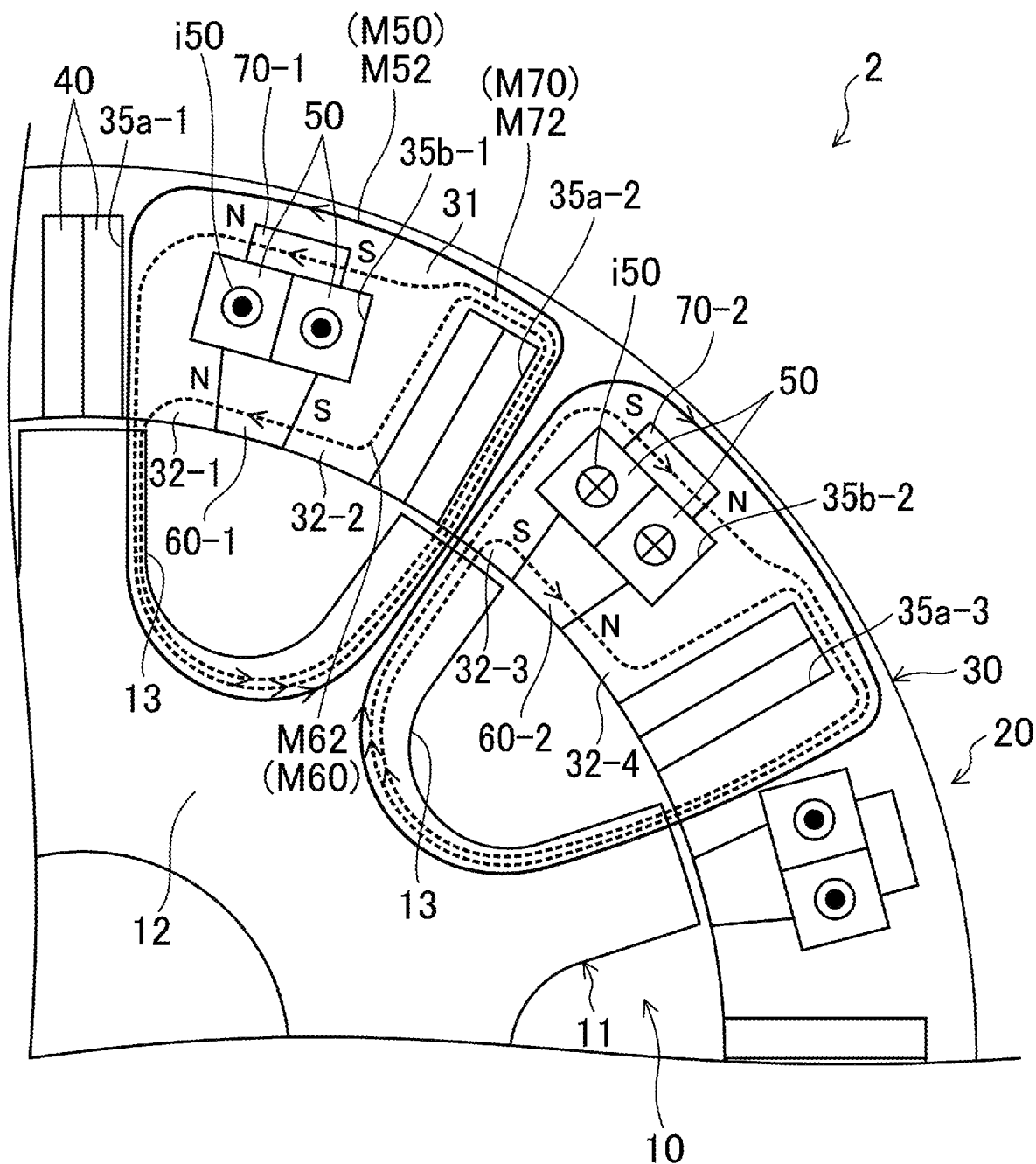
FIG. 16 is a cross-sectional view illustrating a flow of flux under second rotation control of Embodiment 2.

FIG. 16 is a view illustrating a flow of flux under the second rotation control of Embodiment 2. In the example of FIG. 16, the short-circuit flux (M51), the first short-circuit flux (M71), and the second short-circuit flux (M61) are eliminated by the magnetic field generated by the supply of the field current (i50) to the field winding (50).

In the second rotation control, the magnetization direction of the first field magnet (70) is set to the forward direction. The operation of the control unit (3) in the second rotation control of Embodiment 2 is similar to the operation of the control unit (3) in the second rotation control of Embodiment 1. Details of the flux under the second rotation control of Embodiment 2 are as follows.

(Flux of Field Winding: Interlinkage Flux)

In the second rotation control, the interlinkage flux (M52) of the field winding (50) of the field slot (35*b*-1) flows from the stator yoke (31), passes through the tooth (32-1), the rotor core (11), and the tooth (32-3) in this order, and returns to the stator yoke (31). As described above, the interlinkage flux (M52) of the field winding (50) of the field slot (35*b*-1) circulates through the stator core (30) and the rotor core (11) in the counterclockwise direction. The flow direction of the interlinkage flux (M52) of the field winding (50) of the field slot (35*b*-2) is opposite to the flow direction of the interlinkage flux (M52) of the field winding (50) of the field slot (35*b*-1).

(Flux of First Field Magnet: First Interlinkage Flux)

In the second rotation control, the first interlinkage flux (M72) of the first field magnet (70-1) flows from the first field magnet (70-1), passes through the tooth (32-1), the rotor core (11), the tooth (32-3), the stator yoke (31), and the tooth (32-2) in this order, and returns to the first field magnet (70-1). As described above, the first interlinkage flux (M72) of the first field magnet (70-1) circulates through the stator core (30) and the rotor core (11) in the counterclockwise direction. The flow direction of the first interlinkage flux (M72) of the first field magnet (70-2) is opposite to the flow direction of the first interlinkage flux (M72) of the first field magnet (70-1).

(Flux of Second Field Magnet: Second Interlinkage Flux)

In the second rotation control, the second interlinkage flux (M62) of the second field magnet (60-1) flows from the second field magnet (60-1), passes through the tooth (32-1), the rotor core (11), the tooth (32-3), the stator yoke (31), and the tooth (32-2) in this order, and returns to the second field magnet (60-1). As described above, the second interlinkage flux (M62) of the second field magnet (60-1) circulates through the stator core (30) and the rotor core (11) in the counterclockwise direction. The flow direction of the second interlinkage flux (M62) of the second field magnet (60-2) is opposite to the flow direction of the second interlinkage flux (M62) of the second field magnet (60-1).

(Advantageous Effects of Second Rotation Control)

In the second rotation control of Embodiment 2, it is possible to obtain advantageous effects similar to the advantageous effects of the second rotation control of Embodiment 1.

In the second rotation control of Embodiment 2, the short-circuit flux (M51) of the field winding (50) passes through the first field magnet (70) in the forward direction. Since the direction in which the short-circuit flux (M51) passes through the first field magnet (70) is the same as the magnetization direction of the first field magnet (70), demagnetization of the first field magnet (70) due to the short-circuit flux (M51) is less likely to occur. As described above, the first field magnet (70) is less likely to be demagnetized during operation of the rotary electric machine (2), thereby improving operating efficiency of the rotary electric machine (2).

(Third Rotation Control)

Figure 17:
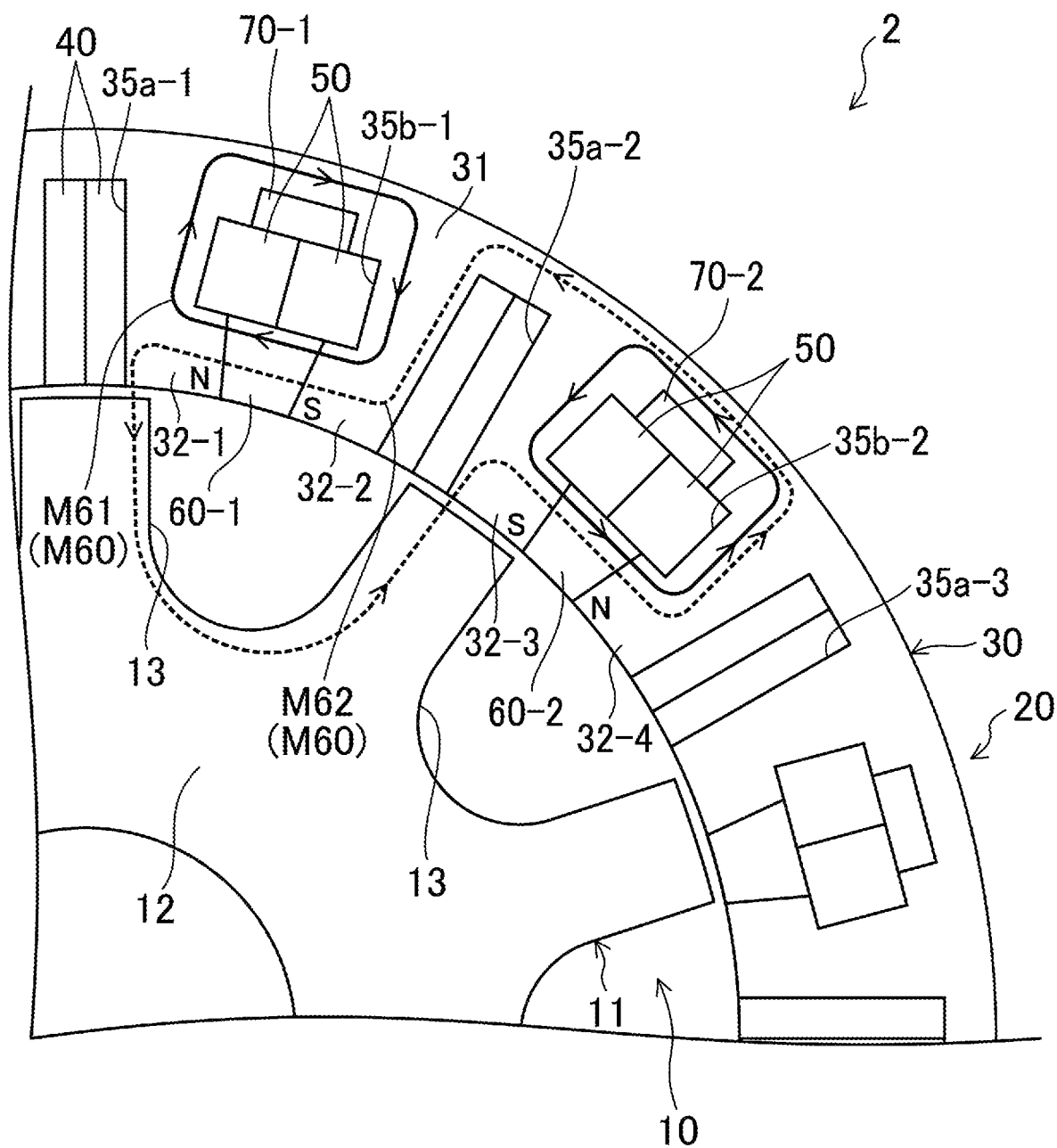
FIG. 17 is a cross-sectional view illustrating a flow of flux under third rotation control of Embodiment 2.

FIG. 17 is a view illustrating a flow of flux under the third rotation control of Embodiment 2.

In the third rotation control, the first field magnet (70) is set to the demagnetized state. The operation of the control unit (3) in the third rotation control of Embodiment 2 is similar to the operation of the control unit (3) in the third rotation control of Embodiment 1. Details of the flux under the third rotation control of Embodiment 2 are as follows.

(Flux of Second Field Magnet)

The second magnet flux (M60) (specifically, the second short-circuit flux (M61) and the second interlinkage flux (M62) under the third rotation control is similar to the second magnet flux (M60) under the first rotation control.

(Advantageous Effects of Third Rotation Control)

In the third rotation control of Embodiment 2, it is possible to obtain advantageous effects similar to the advantageous effects of the third rotation control of Embodiment 1.

(Fourth Rotation Control)

Figure 18:
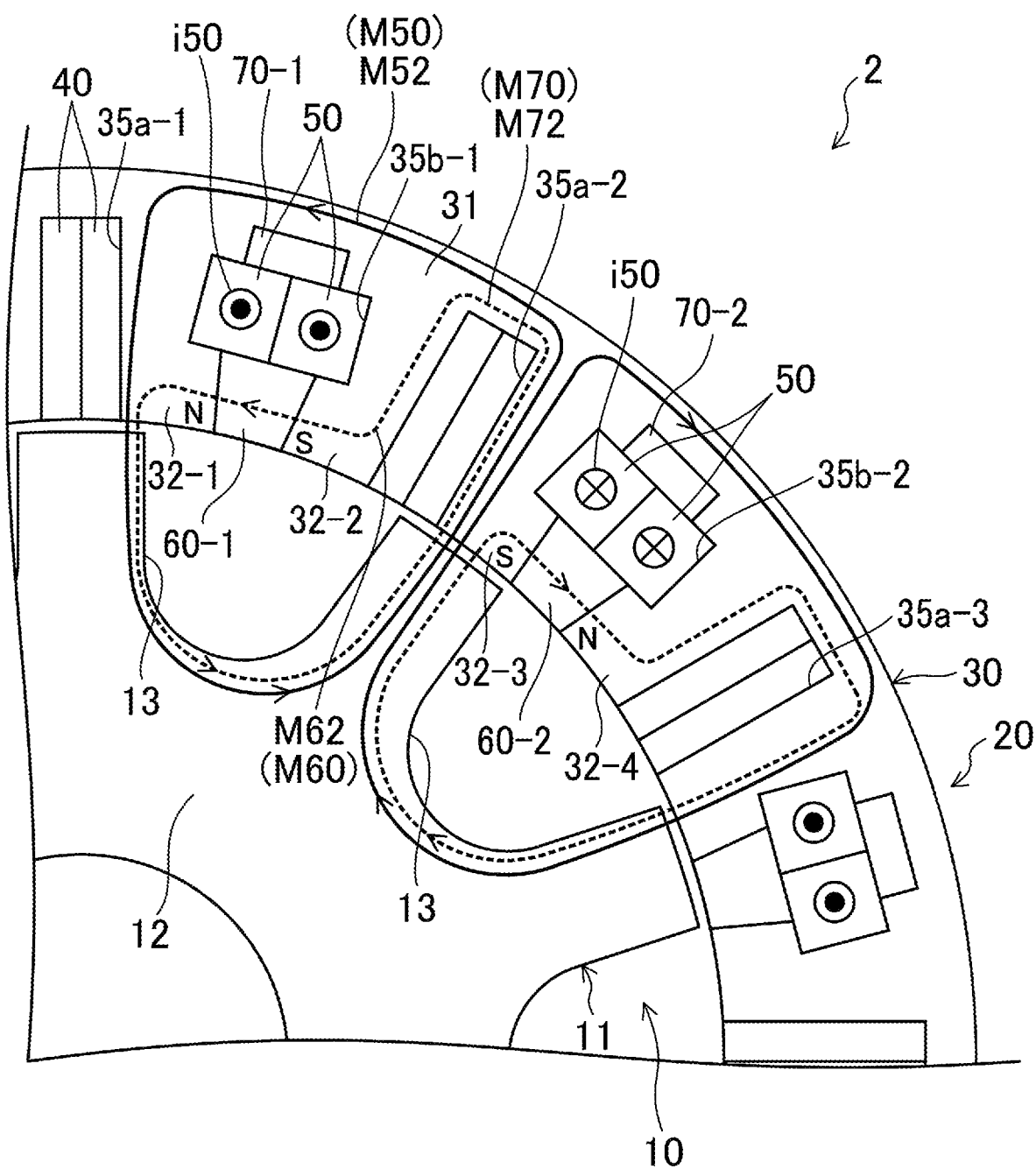
FIG. 18 is a cross-sectional view illustrating a flow of flux under fourth rotation control of Embodiment 2.

FIG. 18 is a view illustrating a flow of flux under the fourth rotation control of Embodiment 2. In the example of FIG. 18, the short-circuit flux (M51) and the second short-circuit flux (M61) are eliminated by the magnetic field generated by the supply of the field current (i50) to the field winding (50).

In the fourth rotation control, the first field magnet (70) is set to the demagnetized state. The operation of the control unit (3) in the fourth rotation control of Embodiment 2 is similar to the operation of the control unit (3) in the fourth rotation control of Embodiment 1. Details of the flux under the fourth rotation control of Embodiment 2 are as follows.

(Flux of Field Winding)

The field flux (M50) (specifically, the interlinkage flux (M52) under the fourth rotation control is similar to the field flux (M50) under the second rotation control.

(Flux of Second Field Magnet)

The second magnet flux (M60) (specifically, the second interlinkage flux (M62) under the fourth rotation control is similar to the second magnet flux (M60) under the third rotation control.

(Advantageous Effects of Fourth Rotation Control)

In the fourth rotation control of Embodiment 2, it is possible to obtain advantageous effects similar to the advantageous effects of the fourth rotation control of Embodiment 1.

(Fifth Rotation Control)

Figure 19:
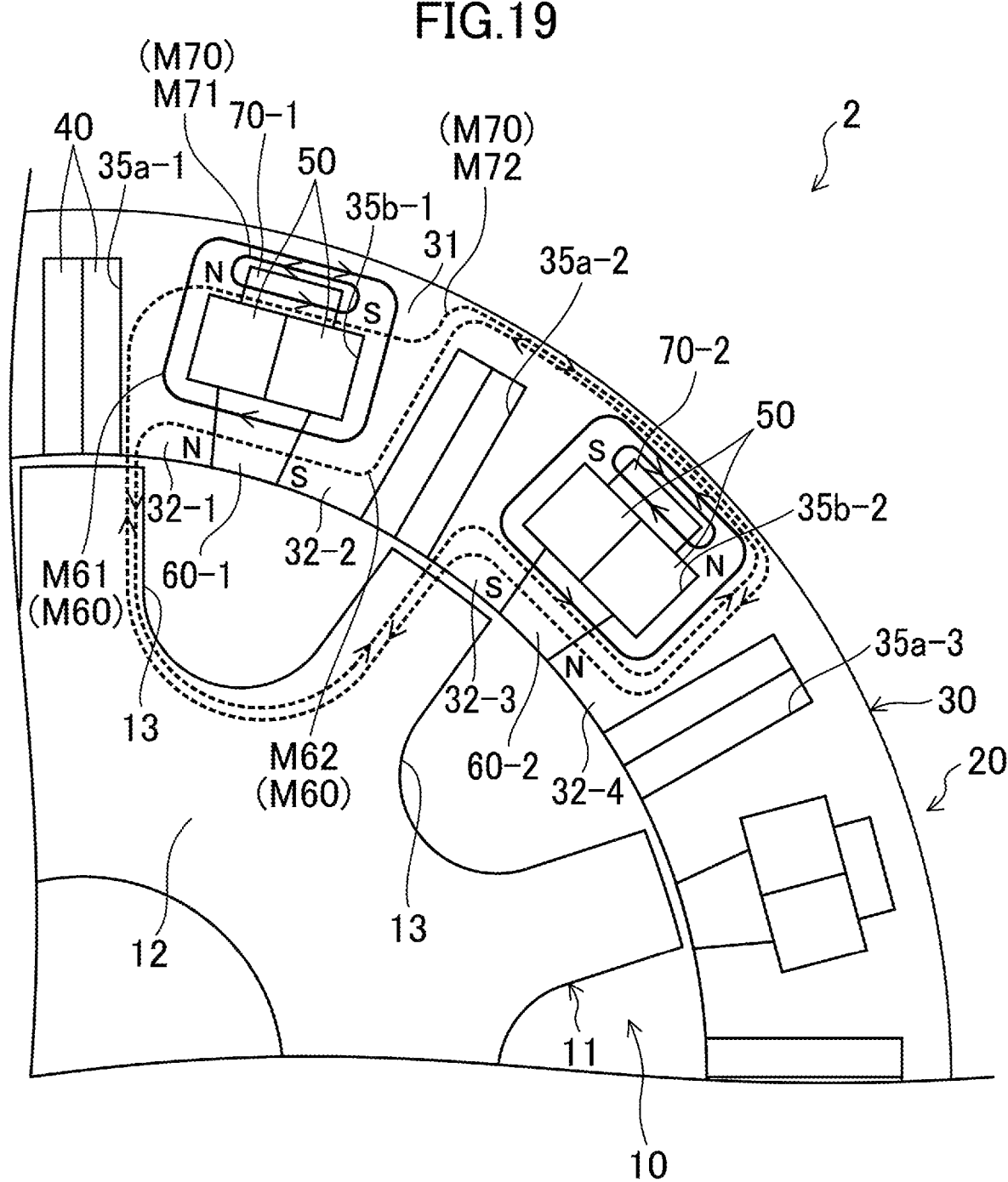
FIG. 19 is a cross-sectional view illustrating a flow of flux under fifth rotation control of Embodiment 2.

FIG. 19 is a view illustrating a flow of flux under the fifth rotation control of Embodiment 2.

In the fifth rotation control, the magnetization direction of the first field magnet (70) is set to the reverse direction. The operation of the control unit (3) in the fifth rotation control of Embodiment 2 is similar to the operation of the control unit (3) in the fifth rotation control of Embodiment 1. Details of the flux under the fifth rotation control of Embodiment 2 are as follows.

(Flux of First Field Magnet: First Short-Circuit Flux)

The flow direction of the first short-circuit flux (M71) under the fifth rotation control is opposite to the flow direction of the first short-circuit flux (M71) under the first rotation control. Specifically, in the fifth rotation control, the first short-circuit flux (M71) of the first field magnet (70-1) flows from the first field magnet (70-1), passes through the tooth (32-2), the stator yoke (31), and the tooth (32-1) in this order, and returns to the first field magnet (70-1). As described above, the first short-circuit flux (M71) of the first field magnet (70-1) circulates through the first field magnet (70-1) and the stator yoke (31) in the counterclockwise direction. The flow direction of the first short-circuit flux (M71) of the first field magnet (70-2) is opposite to the flow direction of the first short-circuit flux (M71) of the first field magnet (70-1).

(Flux of First Field Magnet: First Interlinkage Flux)

The flow direction of the first interlinkage flux (M72) under the fifth rotation control is opposite to the flow direction of the first interlinkage flux (M72) under the first rotation control. Specifically, in the fifth rotation control, the first interlinkage flux (M72) of the first field magnet (70-1) and the first interlinkage flux (M72) of the first field magnet (70-2) are combined. The first interlinkage flux (M72) of the first field magnets (70-1, 70-2) flows from the first field magnet (70-1), passes through the tooth (32-2), the stator yoke (31), the tooth (32-4), the second field magnet (60-2), the tooth (32-3), the rotor core (11), and the tooth (32-1) in this order, and returns to the first field magnet (70-1). As described above, the first interlinkage flux (M72) of the first field magnets (70-1, 70-2) circulates through the stator core (30) and the rotor core (11) in the clockwise direction.

(Flux of Second Field Magnet)

The second magnet flux (M60) (specifically, the second short-circuit flux (M61) and the second interlinkage flux (M62) under the fifth rotation control is similar to the second magnet flux (M60) under the first rotation control.

(Advantageous Effects of Fifth Rotation Control)

In the fifth rotation control of Embodiment 2, it is possible to obtain advantageous effects similar to the advantageous effects of the fifth rotation control of Embodiment 1.

(Sixth Rotation Control)

Figure 20:
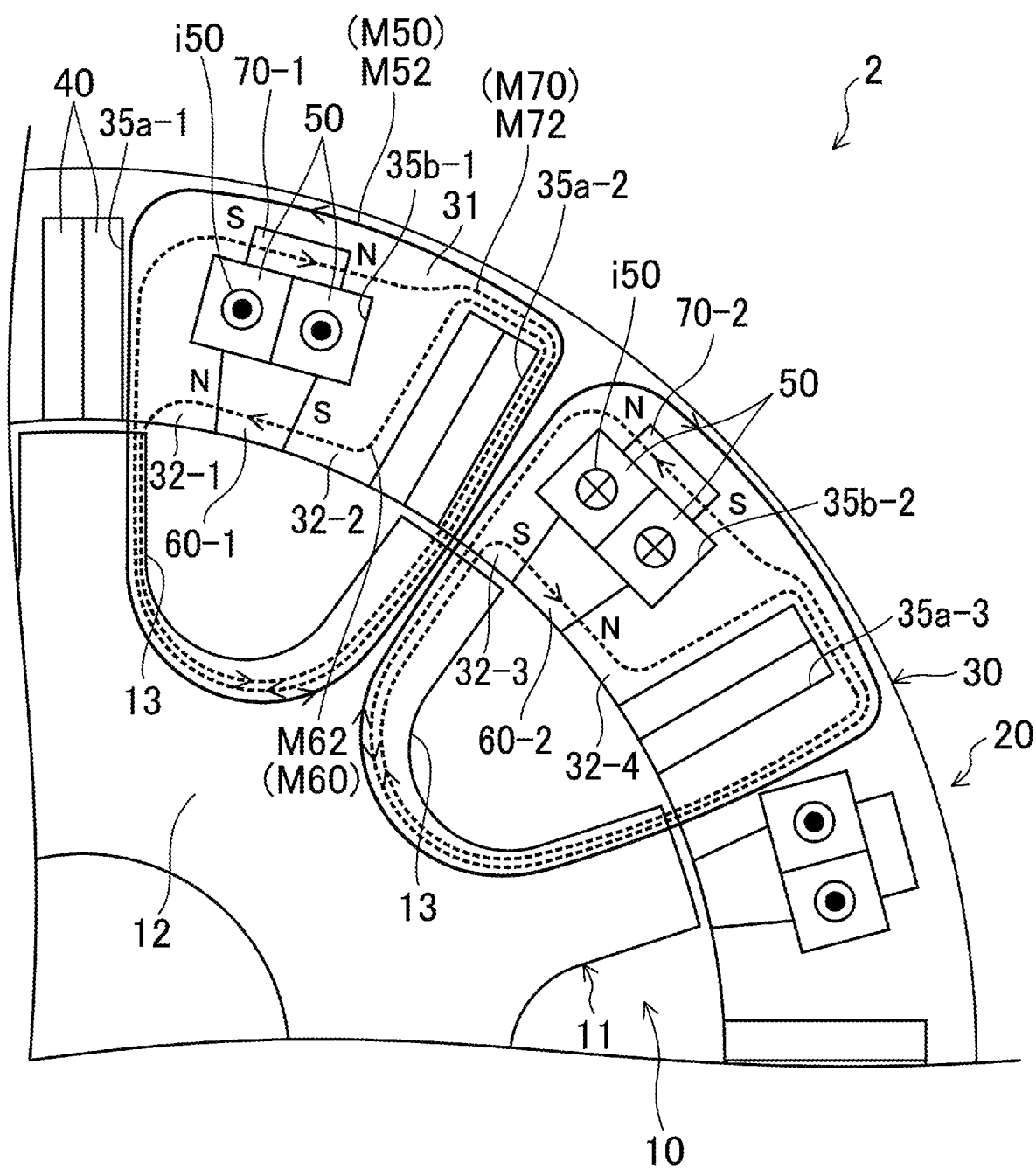
FIG. 20 is a cross-sectional view illustrating a flow of flux under sixth rotation control of Embodiment 2.

FIG. 20 is a view illustrating a flow of flux under the sixth rotation control of Embodiment 2. In the example of FIG. 20, the short-circuit flux (M51), the first short-circuit flux (M71), and the second short-circuit flux (M61) are eliminated by the magnetic field generated by the supply of the field current (i50) to the field winding (50).

In the sixth rotation control, the magnetization direction of the first field magnet (70) is set to the reverse direction. The operation of the control unit (3) in the sixth rotation control of Embodiment 2 is similar to the operation of the control unit (3) in the sixth rotation control of Embodiment 1. Details of the flux under the sixth rotation control of Embodiment 2 are as follows.

(Flux of Field Winding)

The field flux (M50) (specifically, the interlinkage flux (M52) under the sixth rotation control is similar to the field flux (M50) under the second rotation control.

(Flux of First Field Magnet: First Interlinkage Flux)

The flow direction of the first interlinkage flux (M72) under the sixth rotation control is opposite to the flow direction of the first interlinkage flux (M72) under the second rotation control. Specifically, in the second rotation control, the first interlinkage flux (M72) of the first field magnet (70-1) flows from the first field magnet (70-1), passes through the tooth (32-2), the stator yoke (31), the tooth (32-3), the rotor core (11), and the tooth (32-1) in this order, and returns to the first field magnet (70-1). As described above, the first interlinkage flux (M72) of the first field magnet (70-1) circulates through the stator core (30) and the rotor core (11) in the clockwise direction. The flow direction of the first interlinkage flux (M72) of the first field magnet (70-2) is opposite to the flow direction of the first interlinkage flux (M72) of the first field magnet (70-1).

(Flux of Second Field Magnet)

The second magnet flux (M60) (specifically, the second interlinkage flux (M62) under the sixth rotation control is similar to the second magnet flux (M60) under the fifth rotation control.

(Advantageous Effects of Sixth Rotation Control)

In the sixth rotation control of Embodiment 2, it is possible to obtain advantageous effects similar to the advantageous effects of the sixth rotation control of Embodiment 1. For example, the sixth rotation control may be omitted. The same applies to other control.

(Advantageous Effects of Embodiment 2)

The rotary electric machine apparatus (1) of Embodiment 2 can provide advantageous effects similar to the advantageous effects of the rotary electric machine apparatus (1) of Embodiment 1. For example, the six operating modes can be provided, and hence the control of the rotary electric machine (2) can be diversified.

In the rotary electric machine apparatus (1) of Embodiment 2, the field winding (50) is disposed radially outward of the second field magnet (60) in the field slot (35b). The first field magnet (70) is disposed radially outward of the field winding (50) in the field slot (35b).

With the above-described configuration, the first field magnet (70) can be brought closer to the field winding (50) than in a case where the second field magnet (60) is interposed between the field winding (50) and the first field magnet (70) in the field slot (35b). Accordingly, since the field flux (M50) of the field winding (50) can be efficiently passed through the first field magnet (70), the magnetic force of the first field magnet (70) can be easily changed by the field flux (M50).

In the rotary electric machine apparatus (1) of Embodiment 2, a circumferential length (LC70) of the first field magnet (70) is equal to or smaller than a circumferential length (LC350) of a portion on a radially outer side of a winding housing portion (350) of the field slot (35b).

With the above-described configuration, when the first field magnet (70) is viewed from the rotor (10) side, an end portion in the circumferential direction of the first field magnet (70) can be prevented from protruding from the winding housing portion (350). Accordingly, it is possible to suppress generation of a fringing flux at the end portion in the circumferential direction of the first field magnet (70), thereby reducing demagnetization of the first field magnet (70) due to the fringing flux. As described above, the flux of the first field magnet (70) can be effectively used.

Embodiment 3

A rotary electric machine apparatus (1) of Embodiment 3 differs from the rotary electric machine apparatus (1) of Embodiment 1 in the configuration in the field slot (35b) of the stator (20) of the rotary electric machine (2). Other configurations of the rotary electric machine apparatus (1) of Embodiment 3 are similar to the configurations of the rotary electric machine apparatus (1) of Embodiment 1.

(Configuration in Field Slot)

Figure 21:
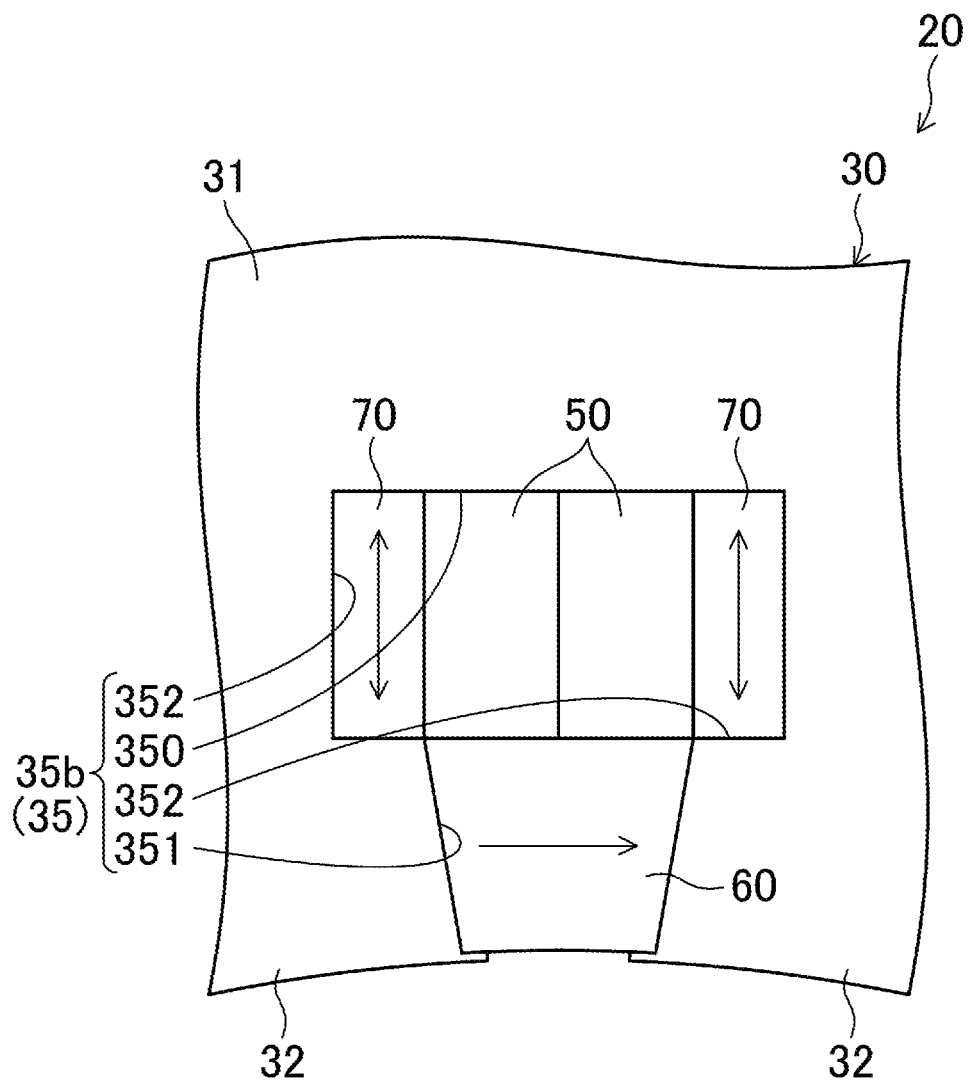
FIG. 21 is a cross-sectional view illustrating a configuration of a main part of a rotary electric machine of Embodiment 3.

FIG. 21 is a view illustrating the configuration in the field slot (35b) in Embodiment 3. In the configuration in the field slot (35b) of Embodiment 3, the disposition of the field winding (50) and the first field magnet (70) is different from the configuration in the field slot (35b) of Embodiment 1. Other configurations in the field slot (35b) of Embodiment 3 are similar to the configurations in the field slot (35b) of Embodiment 1.

In Embodiment 3, the winding housing portion (350) is disposed radially outward of the second magnet housing portion (351). The first magnet housing portion (352) is not sandwiched between winding housing portions (350), but is disposed on at least one of both sides of the winding housing portion (350) in the circumferential direction. With such a configuration, the field winding (50) is disposed radially outward of the second field magnet (60) in the field slot (35b). The first field magnet (70) is not sandwiched between field windings (50) in the field slot (35b), but is disposed on at least one of both sides of the field winding (50) in the circumferential direction. The first field magnet (70) is magnetized in the radial direction.

In the example of FIG. 21, first field magnets (70) are disposed on both sides of the field winding (50) in the circumferential direction in the field slot (35b). As described above, two first field magnets (70) are housed in one field slot (35b). The first field magnets (70) are magnetized so that the pole faces face in the radial direction. In other words, the first field magnets (70) can be magnetized in the radial direction, and the magnetization direction can be a direction along the radial direction. The forward direction of the first field magnet (70) on the right side of FIG. 21 is a direction from the upper side to the lower side of FIG. 21, and the forward direction of the first field magnet (70) on the left side of FIG. 21 is a direction from the lower side to the upper side of FIG. 21.

(Operation of Control Unit)

Similarly to the control unit (3) of the Embodiment 1, the control unit (3) of Embodiment 3 selectively performs first magnetic force control, second magnetic force control, first rotation control, second rotation control, third rotation control, fourth rotation control, fifth rotation control, and sixth rotation control.

(Advantageous Effects of Embodiment 3)

The rotary electric machine apparatus (1) of Embodiment 3 can provide advantageous effects similar to the advantageous effects of the rotary electric machine apparatus (1) of Embodiment 1. For example, the six operating modes can be provided, and hence the control of the rotary electric machine (2) can be diversified.

In the rotary electric machine apparatus (1) of Embodiment 3, the field winding (50) is disposed radially outward of the second field magnet (60) in the field slot (35b). The first field magnet (70) is not sandwiched between field windings (50) in the field slot (35b), but is disposed on at least one of both sides of the field winding (50) in the circumferential direction. The first field magnet (70) is magnetized in the radial direction.

With the above-described configuration, the first field magnet (70) can be brought closer to the field winding (50) than in a case where the second field magnet (60) is interposed between the field winding (50) and the first field magnet (70) in the field slot (35b). Accordingly, since the field flux (M50) of the field winding (50) can be efficiently passed through the first field magnet (70), the magnetic force of the first field magnet (70) can be easily changed by the field flux (M50).

Embodiment 4

Figure 22:
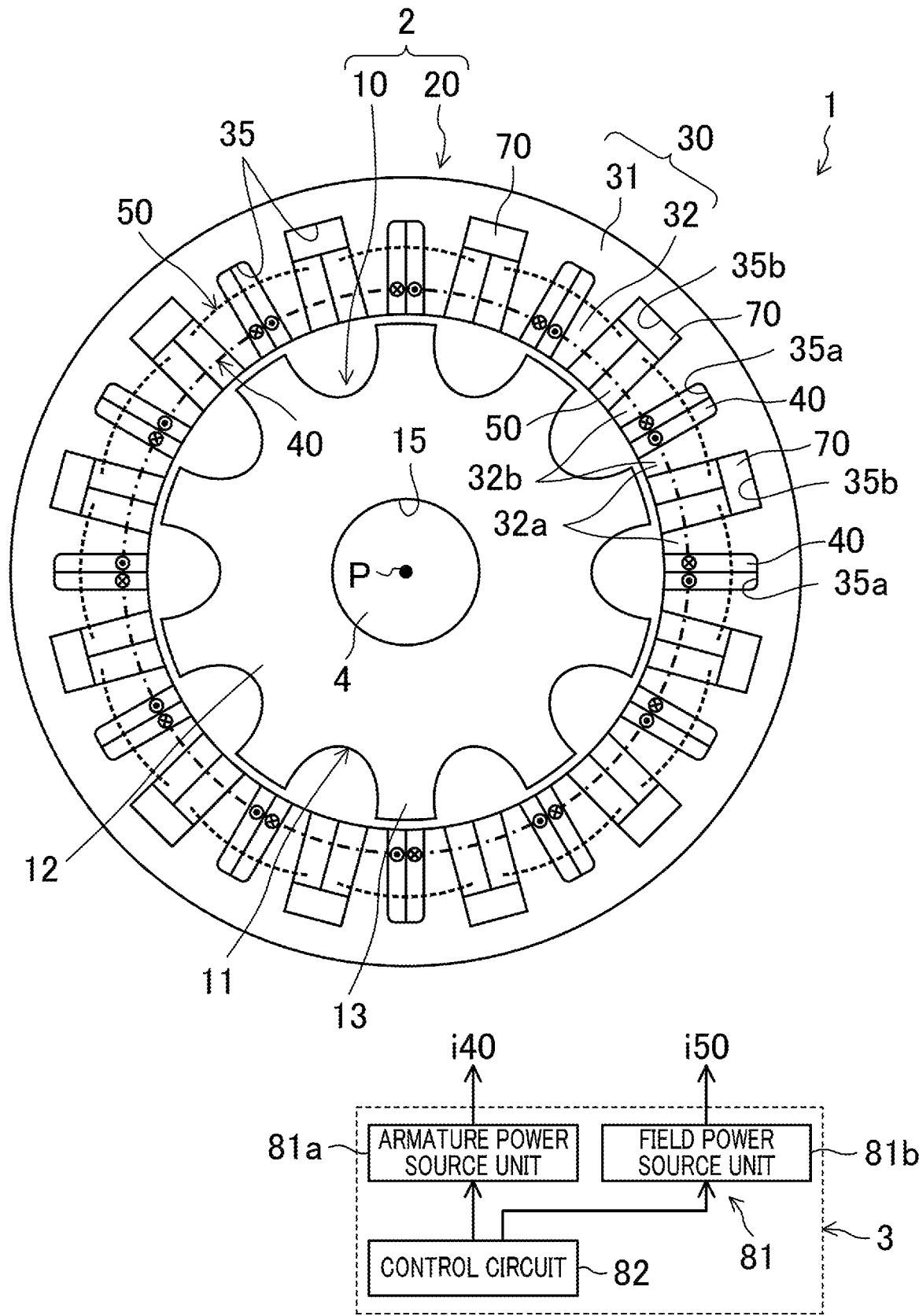
FIG. 22 is a cross-sectional view illustrating a configuration of a rotary electric machine apparatus of Embodiment 4.

FIG. 22 is a view illustrating a configuration of a rotary electric machine apparatus (1) of Embodiment 4. The rotary electric machine apparatus (1) of Embodiment 4 differs from the rotary electric machine apparatus (1) of Embodiment 2 in the configuration in the field slot (35b) of the stator (20) of the rotary electric machine (2). Other configurations of the rotary electric machine apparatus (1) of Embodiment 4 are similar to the configurations of the rotary electric machine apparatus (1) of Embodiment 2.

(Configuration in Field Slot)

In Embodiment 4, the second field magnet (60) is omitted in the field slot (35b). The first field magnet (70) is disposed radially outward of the field winding (50) in the field slot (35b).

(Forward Direction and Reverse Direction)

The "forward direction" of the magnetization direction of the first field magnet (70) in Embodiment 4 is a predetermined magnetization direction. The "reverse direction" of the magnetization direction of the first field magnet (70) in Embodiment 4 is a direction opposite to the predetermined magnetization direction.

(Operation of Control Unit)

Similarly to the control unit (3) of the Embodiment 2, the control unit (3) of Embodiment 4 selectively performs first magnetic force control, second magnetic force control, first rotation control, second rotation control, third rotation control, fourth rotation control, fifth rotation control, and sixth rotation control.

(Advantageous Effects of Embodiment 4)

The rotary electric machine apparatus (1) of Embodiment 4 can provide advantageous effects similar to the advantageous effects of the rotary electric machine apparatus (1) of Embodiment 2. For example, the six operating modes can be provided, and hence the control of the rotary electric machine (2) can be diversified.

Embodiment 5

FIG. 23 is a view illustrating a configuration of a rotary electric machine apparatus (1) of Embodiment 5. The rotary electric machine apparatus (1) of Embodiment 5 differs from the rotary electric machine apparatus (1) of Embodiment 1 in the configuration in the field slot (35b) of the stator (20) of the rotary electric machine (2). Other configurations of the rotary electric machine apparatus (1) of Embodiment 5 are similar to the configurations of the rotary electric machine apparatus (1) of Embodiment 1.

In Embodiment 5, the field slot (35b) includes a first field slot (35c) and a second field slot (35d). The first field slot (35c) houses the field winding (50) and the first field magnet (70). The second field slot (35d) houses the field winding (50) and the second field magnet (60).

In this example, the first field slot (35c) and the second field slot (35d) are adjacent to each other with the armature slot (35a) interposed therebetween. In FIG. 23, the first field slot (35c), the armature slot (35a), the second field slot (35d), and the armature slot (35a) are arranged in this order in the circumferential direction.

In the first field slot (35c), the first field magnet (70) is disposed radially outward of the field winding (50). In the second field slot (35d), the second field magnet (60) is disposed radially inward of the field winding (50).

(Operation of Control Unit)

Similarly to the control unit (3) of the Embodiment 1, the control unit (3) of Embodiment 5 selectively performs first magnetic force control, second magnetic force control, first rotation control, second rotation control, third rotation control, fourth rotation control, fifth rotation control, and sixth rotation control.

(Advantageous Effects of Embodiment 5)

The rotary electric machine apparatus (1) of Embodiment 5 can provide advantageous effects similar to the advantageous effects of the rotary electric machine apparatus (1) of Embodiment 1. For example, the six operating modes can be provided, and hence the control of the rotary electric machine (2) can be diversified.

In the rotary electric machine apparatus (1) of Embodiment 5, the field slot (35b) includes a first field slot (35c) housing the first field magnet (70) but not housing the second field magnet (60), and a second field slot (35d) housing the second field magnet (60) but not housing the first field magnet (70).

With such a configuration, the number of first field magnets (70) and the number of second field magnets (60) can be reduced as compared with the case where both the first field magnets (70) and the second field magnets (60) are housed in all field slots (35b). Also, permeance coefficients of the first field magnet (70) and the second field magnet (60) can be increased. Accordingly, demagnetization resistance of the first field magnet (70) and the second field magnet (60) can be improved.

In the rotary electric machine apparatus (1) of Embodiment 5, in the first field slot (35c), the first field magnet (70) is disposed radially outward of the field winding (50). With such a configuration, the first field magnet (70) can be brought farther from the rotor (10). Accordingly, the first field magnet (70) can be less likely to be demagnetized.

In the case where the first field magnet (70) is disposed radially outward of the field winding (50) in the first field slot (35c), when the field current (i50) is supplied to the field winding (50) in the rotation control, the field flux (M50) generated by energization of the field winding (50) passes through the first field magnet (70) in the forward direction. When the first field magnet (70) is magnetized in the forward direction, the direction in which the field flux (M50) passes through the first field magnet (70) is the same as the magnetization direction in which the first field magnet (70) is magnetized, so that demagnetization of the first field magnet (70) by the field flux (M50) is less likely to occur.

In the rotary electric machine apparatus (1) of Embodiment 5, in the second field slot (35d), the second field magnet (60) is disposed radially inward of the field winding (50). With such a configuration, the second field magnet (60) can be brought closer to the rotor (10) than in a case where the second field magnet (60) is disposed radially outward of the field winding (50). Also, it is possible to relax magnetic saturation at a distal end of the tooth (32) and to pass more flux. Accordingly, it is easy for the flux of the second field magnet (60) to interlink with the rotor (10), so that the flux of the second field magnet (60) can be effectively used, and torque characteristics of the rotary electric machine (2) can be improved.

In the description of Embodiment 5, the case where the first field slot (35c) and the second field slot (35d) are adjacent to each other with the armature slot (35a) interposed therebetween has been described as an example; however, it is not limited thereto. For example, two first field slots (35c) may be adjacent to each other with an armature slot (35a) interposed therebetween, or two second field slots (35d) may be adjacent to each other with an armature slot (35a) interposed therebetween.

In Embodiment 5, a magnetomotive force of the field winding (50) housed in the first field slot (35c) may be equal to or different from a magnetomotive force of the field winding (50) housed in the second field slot (35d). For example, the number of turns of the field winding (50) housed in the first field slot (35c) may be equal to or different from the number of turns of the field winding (50) housed in the second field slot (35d).

(Compressor)

Figure 24:
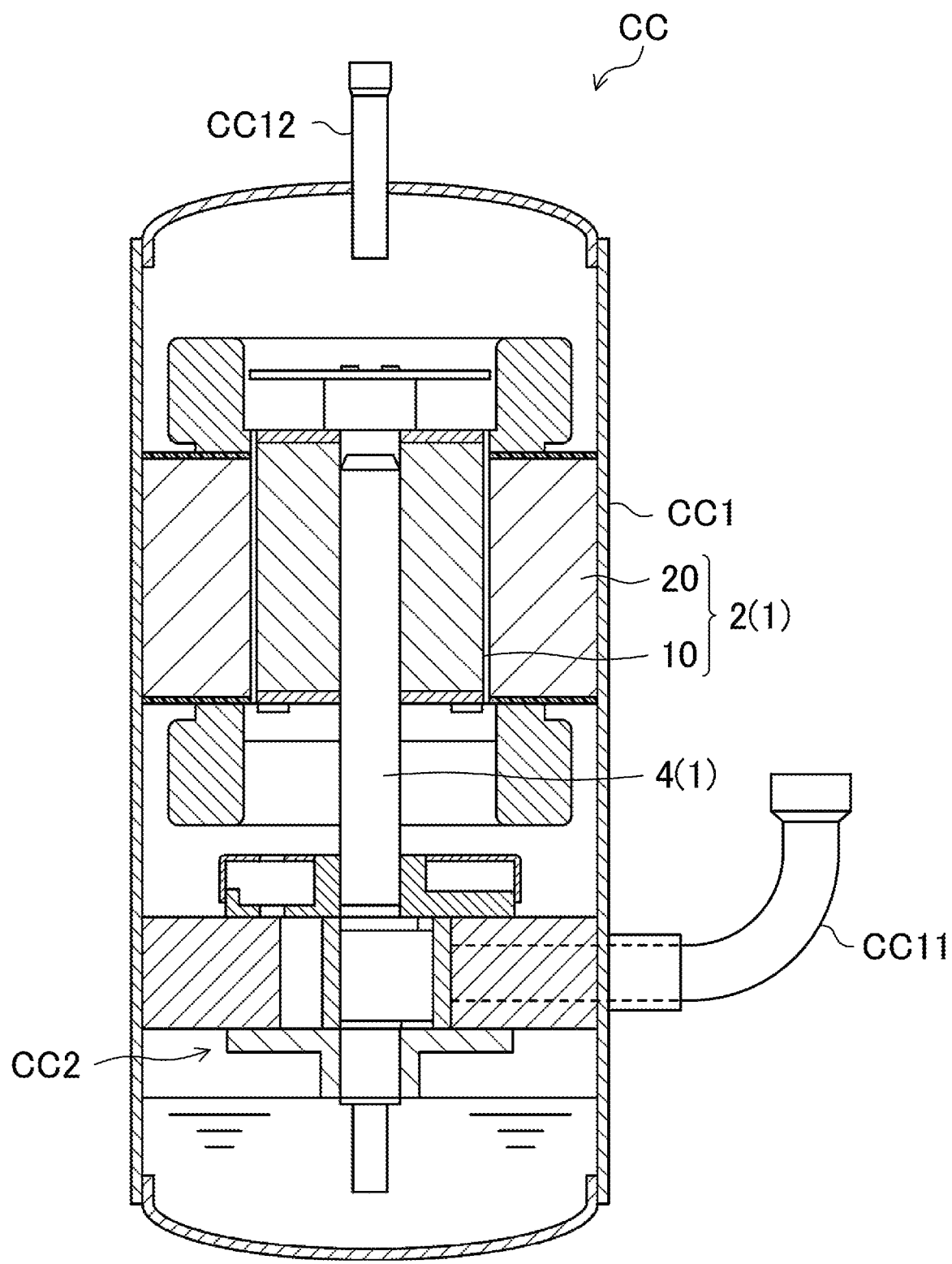
FIG. 24 is a longitudinal sectional view illustrating a configuration of a compressor.

FIG. 24 is a view illustrating a configuration of a compressor (CC). The compressor (CC) includes a rotary electric machine apparatus (1), a casing (CC1) and a compression mechanism (CC2).

The casing (CC1) houses the compression mechanism (CC2) and a rotary electric machine (2). In this example, the casing (CC1) is formed in a circular cylindrical shape extending in the vertical direction and having both ends closed. The casing (CC1) is provided with a suction pipe (CC11) and a discharge pipe (CC12). The suction pipe (CC11) penetrates through a body portion of the casing (CC1) and is connected to the compression mechanism (CC2). The discharge pipe (CC12) penetrates through an upper portion of the casing (CC1) and communicates with an internal space of the casing (CC1).

The compression mechanism (CC2) compresses a fluid. In this example, the compression mechanism (CC2) is disposed below the rotary electric machine (2). The compression mechanism (CC2) compresses the fluid sucked through the suction pipe (CC11) and discharges the compressed fluid to the internal space of the casing (CC1). The fluid discharged into the internal space of the casing (CC1) is discharged through the discharge pipe (CC12). In this example, the compression mechanism (CC2) is a rotary type compression mechanism.

The shaft (4) couples the rotary electric machine (2) with the compression mechanism (CC2). In this example, the shaft (4) extends in the vertical direction. The rotary electric machine (2) rotationally drives the shaft (4). The compression mechanism (CC2) is driven by rotational driving of the shaft (4).

(Refrigeration Device)

Figure 25:
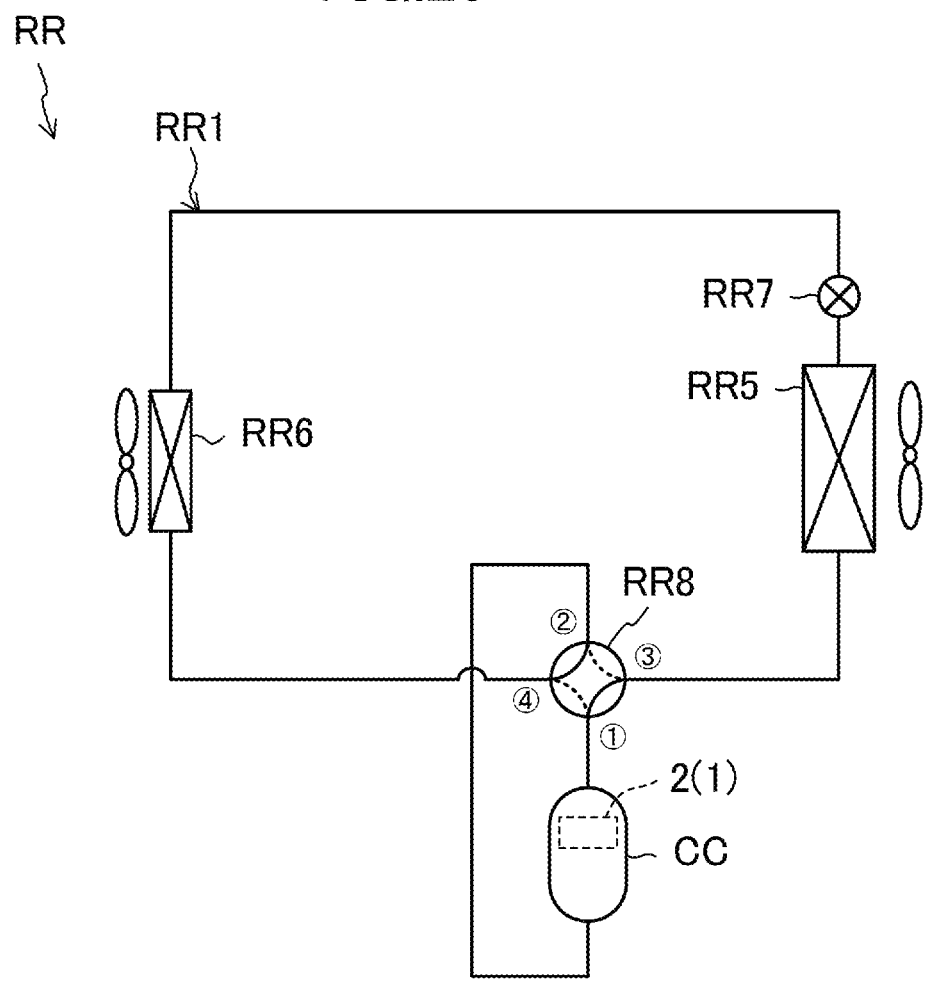
FIG. 25 is a pipe system diagram illustrating a configuration of a refrigeration device.

FIG. 25 is a diagram illustrating a configuration of a refrigeration device (RR). The refrigeration device (RR) includes a refrigerant circuit (RR1) in which a refrigerant circulates. In this example, the refrigeration device (RR) constitutes an air conditioner.

Specifically, the refrigerant circuit (RR1) has a compressor (CC) having a rotary electric machine apparatus (1), a first heat exchanger (RR5), a second heat exchanger (RR6), an expansion mechanism (RR7), and a four-way switching valve (RR8).

The compressor (CC) compresses the refrigerant and discharges the compressed refrigerant. The discharge side of the compressor (CC) is connected to a first port of the four-way switching valve (RR8). The suction side of the compressor (CC) is connected to a second port of the four-way switching valve (RR8).

The first heat exchanger (RR5) performs heat exchange between the refrigerant and air. The gas end of the first heat exchanger (RR5) is connected to a third port of the four-way switching valve (RR8). The liquid end of the first heat exchanger (RR5) is connected to the liquid end of the second heat exchanger (RR6) via the expansion mechanism (RR7). For example, the first heat exchanger (RR5) is a heat-source heat exchanger and is provided outdoors.

The second heat exchanger (RR6) performs heat exchange between the refrigerant and air. The gas end of the second heat exchanger (RR6) is connected to a fourth port of the four-way switching valve (RR8). For example, the second heat exchanger (RR6) is a use heat exchanger and is provided indoors.

The expansion mechanism (RR7) expands the refrigerant to decompress the refrigerant. For example, the expansion mechanism (RR7) is an electronic expansion valve.

The four-way switching valve (RR8) is switchable between a first state (a state indicated by solid lines in FIG. 25) in which the first port and the third port communicate with each other and the second port and the fourth port communicate with each other, and a second state (a state indicated by broken lines in FIG. 25) in which the first port and the fourth port communicate with each other and the second port and the third port communicate with each other.

When the four-way switching valve (RR8) is in the first state, the refrigerant discharged from the compressor (CC) radiates heat in the first heat exchanger (RR5), is decompressed in the expansion mechanism (RR7), and then absorbs heat in the second heat exchanger (RR6). The refrigerant flowing out of the second heat exchanger (RR6) is sucked into the compressor (CC).

When the four-way switching valve (RR8) is in the second state, the refrigerant discharged from the compressor (CC) radiates heat in the second heat exchanger (RR6), is decompressed in the expansion mechanism (RR7), and then absorbs heat in the first heat exchanger (RR5). The refrigerant flowing out of the first heat exchanger (RR5) is sucked into the compressor (CC).

(Vehicle)

Figure 26:
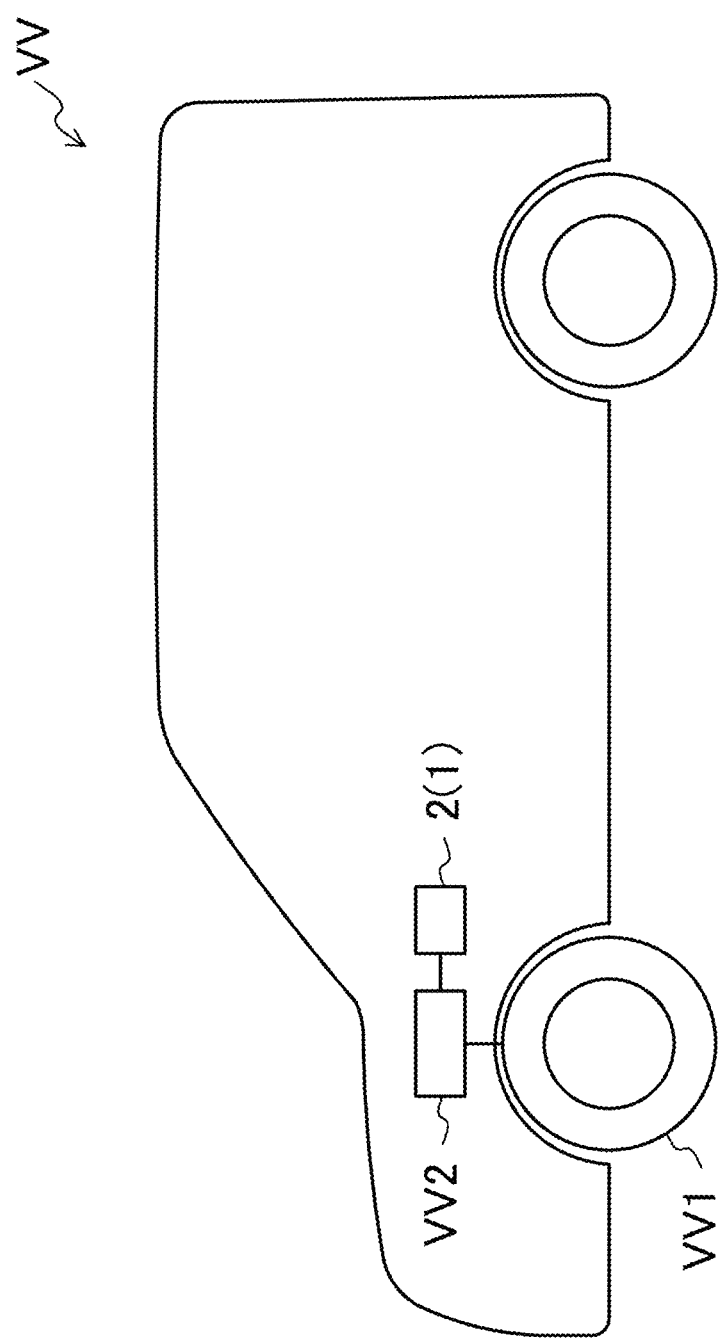
FIG. 26 is a schematic diagram illustrating a configuration of a vehicle.

FIG. 26 is a diagram illustrating a configuration of a vehicle (VV). The vehicle (VV) includes a rotary electric machine apparatus (1), a wheel (VV1), and a power transmission mechanism (VV2). The power transmission mechanism (VV2) transmits a rotational force of the rotary electric machine (2) to the wheel (VV1). When the rotary electric machine (2) is rotationally driven, the rotational force of the rotary electric machine (2) is transmitted to the wheel (VV1) through the power transmission mechanism (VV2), and the wheel (VV1) is rotationally driven.

Other Embodiments

The flows of various fluxes illustrated in FIGS. 3 to 10 and FIGS. 13 to 20 are merely examples, and various flux paths may differ from the examples depending on the rotational position of the rotor (10) (for example, the position of the protrusion (13). However, even though the rotational position of the rotor (10) changes, various fluxes flow through the rotor (10) and act on the rotor (10) as field fluxes.

In the above description, the rotary electric machine (2) constitutes an inner rotor type electric motor. Thus, the radially outer side is the side farther from the rotor (10), and the radially inner side is the side closer to the rotor (10).

In the above description, the case where the rotary electric machine (2) constitutes the inner rotor type electric motor has been described as an example; however, it is not limited thereto. For example, the rotary electric machine (2) may constitute an outer rotor type electric motor.

In the above description, the case where the control unit (3) controls the rotary electric machine (2) based on outputs of various sensors (not illustrated) that detect various parameters of the rotary electric machine (2) has been described as an example; however, it is not limited thereto. For example, the control unit (3) may control the rotary electric machine (2) by sensorless operation.

In the above description, the case where the rotary electric machine (2) constitutes the electric motor has been described as an example; however, the rotary electric machine (2) may constitute a generator.

In the above description, the case where the rotor core (11) and the stator core (30) are constituted by the multilayer cores has been described as an example; however, it is not limited thereto. For example, the rotor core (11) and the stator core (30) may be constituted by a powder magnetic core containing an insulator.

In the above description, the case where the through hole (15) into which the shaft (4) is inserted is provided in the central portion of the rotor core (11) has been described as an example; however, it is not limited thereto. For example, the shaft (4) may be attached to end plates (not illustrated) provided on both sides of the rotor core (11) in the axial direction. In this case, the through hole (15) is not required.

In the above description, the case where the first field magnet (70) is disposed radially outward of the second field magnet (60) in the field slot (35b) has been described; however, it is not limited thereto. For example, the first field magnet (70) may be disposed radially inward of the second field magnet (60) in the field slot (35b).

In the above description, the case where the winding housing portion (350), the first magnet housing portion (352), and the second magnet housing portion (351) communicate with each other in the field slot (35b) has been described as an example; however, it is not limited thereto. For example, the winding housing portion (350), the first magnet housing portion (352), and the second magnet housing portion (351) may be adjacent to each other with a thin wall portion (not illustrated) interposed therebetween. In other words, the winding housing portion (350), the first magnet housing portion (352), and the second magnet housing portion (351) may be slots independent of each other, and the field slot (35b) may be an aggregate of these slots.

Although the embodiments and the modifications have been described above, it will be understood that various changes in modes and details may be made without departing from the idea and scope of the claims. The above-described embodiments and modifications may be appropriately combined or replaced as long as the target functions of the present disclosure are not impaired.

As described above, the present disclosure is useful as a rotary electric machine, a compressor, a refrigeration device, and a vehicle.

The invention claimed is:

1. A rotary electric machine comprising:
a rotor; and
a stator facing the rotor with a predetermined gap interposed therebetween,
the stator having
a stator core formed in a substantially circular annular shape and provided with an armature slot and a field slot alternately arranged in a circumferential direction,
an armature winding housed in the armature slot, and
a field winding, a first field magnet, and a second field magnet that are housed in the field slot,
the armature winding being configured to generate a rotating magnetic field to rotate the rotor by being supplied with an alternating-current armature current,
the field winding being configured to generate a field flux by being supplied with a direct-current field current,
the first field magnet being configured to change, by the field flux, a magnitude and direction of a magnetic force of the first field magnet, the second field magnet being disposed magnetically in parallel with the first field magnet and having pole faces facing in the circumferential direction, a product of a residual flux density of the second field magnet and a pole area of the second field magnet being larger than a product of a residual flux density of the first field magnet and a pole area of the first field magnet.

2. The rotary electric machine according to claim 1, wherein
in an operating temperature range of the rotary electric machine, a maximum value of a coercive force of the first field magnet is smaller than a minimum value of a coercive force of the second field magnet.

3. The rotary electric machine according to claim 1, wherein
the first field magnet is disposed farther from the rotor than the second field magnet in the field slot.

4. The rotary electric machine according to claim 3, wherein
the field winding is disposed farther from the rotor than the first field magnet in the field slot.

5. The rotary electric machine according to claim 4, wherein
a circumferential length of the first field magnet is
equal to or smaller than a circumferential length of a portion of the second field magnet farther from the rotor, and
equal to or smaller than a circumferential length of a portion of a winding housing portion of the field slot closer to the rotor, the winding housing portion housing the field winding.

6. The rotary electric machine according to claim 3, wherein
the field winding is disposed farther from the rotor than the second field magnet in the field slot, and
the first field magnet is disposed farther from the rotor than the field winding in the field slot.

7. The rotary electric machine according to claim 6, wherein
a circumferential length of the first field magnet is equal to or smaller than a circumferential length of a portion of a winding housing portion of the field slot farther from the rotor, the winding housing portion housing the field winding.

8. A rotary electric machine comprising:
a rotor; and
a stator facing the rotor with a predetermined gap interposed therebetween,
the stator having
a stator core formed in a substantially circular annular shape and provided with an armature slot and a field slot alternately arranged in a circumferential direction,
an armature winding housed in the armature slot, and
a field winding and a first field magnet housed in the field slot,
the armature winding being configured to generate a rotating magnetic field to rotate the rotor by being supplied with an alternating-current armature current,
the field winding being configured to generate a field flux by being supplied with a direct-current field current,
the first field magnet being configured to change a magnetic force by the field flux,
the stator having a second field magnet housed in the field slot,
the second field magnet being disposed magnetically in parallel with the first field magnet, and having pole faces facing in the circumferential direction,
the first field magnet being disposed farther from the rotor than the second field magnet in the field slot,
the field winding being disposed farther from the rotor than the second field magnet in the field slot,
the first field magnet
being disposed on at least one side of the field winding in the circumferential direction without being sandwiched between the field windings in the field slot, and
being magnetized in a radial direction.

9. A rotary electric machine comprising:
a rotor; and
a stator facing the rotor with a predetermined gap interposed therebetween,
the stator having
a stator core formed in a substantially circular annular shape and provided with an armature slot and a field slot alternately arranged in a circumferential direction,
an armature winding housed in the armature slot, and
a field winding and a first field magnet housed in the field slot,
the armature winding being configured to generate a rotating magnetic field to rotate the rotor by being supplied with an alternating-current armature current,
the field winding being configured to generate a field flux by being supplied with a direct-current field current,
the first field magnet being configured to change a magnetic force by the field flux,
the stator having a second field magnet,
the field slot including
a first field slot housing the field winding and the first field magnet, and
a second field slot housing the field winding and the second field magnet.

10. The rotary electric machine according to claim 9, wherein
the first field slot and the second field slot are adjacent to each other with the armature slot interposed therebetween.

11. The rotary electric machine according to claim 9, wherein
the first field magnet is disposed farther from the rotor than the field winding in the first field slot, and
the second field magnet is disposed closer to the rotor than the field winding in the second field slot.

12. A compressor including the rotary electric machine according to claim 1.

13. A refrigeration device including the compressor according to claim 12.

14. A vehicle including the rotary electric machine according to claim 1.

15. The rotary electric machine according to claim 2, wherein
the first field magnet is disposed farther from the rotor than the second field magnet in the field slot.

16. The rotary electric machine according to claim 10, wherein
the first field magnet is disposed farther from the rotor than the field winding in the first field slot, and
the second field magnet is disposed closer to the rotor than the field winding in the second field slot.

* * * * *